US006784899B1

(12) United States Patent
Barrus et al.

(10) Patent No.: US 6,784,899 B1
(45) Date of Patent: Aug. 31, 2004

(54) SYSTEMS AND METHODS FOR PROVIDING RICH MULTIMEDIA MESSAGES TO REMOTE USERS USING TELEPHONES AND FACSIMILE MACHINES

(75) Inventors: John W. Barrus, Menlo Park, CA (US); Gregory J. Wolff, Redwood City, CA (US); William R. Softky, Menlo Park, CA (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/540,042

(22) Filed: Mar. 31, 2000

(51) Int. Cl.⁷ ................................................ G06F 3/00
(52) U.S. Cl. .................... 345/717; 345/764; 345/733; 345/740; 345/748; 345/727; 715/501.1
(58) Field of Search .............................. 345/700, 716, 345/717, 719, 721, 727, 731, 733, 740, 741, 748, 751, 752, 753, 764; 707/9, 10, 104.1; 709/201, 204, 217; 715/501.1; 379/88.13, 88.19, 88.2, 742.01–142.18, 207.14, 207.15

(56) References Cited

U.S. PATENT DOCUMENTS 5,153,744 A * 10/1992 Nobuta ...................... 358/400

(List continued on next page.)

FOREIGN PATENT DOCUMENTS

| EP | 0 615 368 A2 | 2/1994 | ............ H04L/12/54 |
| EP | 0 785 661 A2 | 7/1997 | ............ H04M/3/50 |
| EP | 0 865 189 A | 9/1998 | ............ H04M/3/50 |
| EP | 1113631 A2 * | 7/2001 | ............ H04L/12/58 |
| WO | WO 91/01606 | 7/1991 | ............ H04N/1/00 |
| WO | WO 97/11549 | 3/1997 | ............ H04M/3/50 |

OTHER PUBLICATIONS

John F. Meech et al, "Intelligent Seamless Messaging", 1998, IEEE, pp. 1241–1244.*
Sanjiv P. Patel et al, "Multimedia Fax–MIME Interworking", 1994, IEEE, pp. 325–330.*
Laurence Likforman–Sulen et al, "Facsimile Processing for a Messaging Server", 1999, IEEE, pp. 539–543.*
A. Hennig et al, "DART—A Software Architecture for the Creation of a Distributed Asynchronous Recognition Toolbox", 1997, IEEE, pp. 439–443.*
Christopher K. Hess et al, "VistaMail: An Integrated Multimedia Mailing System", 1998, IEEE, pp. 13–23.*
Richard V. Cox et al, "On the applications of multimedia processing to communications", 1998, IEEE, pp. 755–824.*

*Primary Examiner*—Raymond J. Bayerl
*Assistant Examiner*—X. L. Bautista
(74) *Attorney, Agent, or Firm*—Fenwick & West LLP

(57) ABSTRACT

A system for receiving, sending and creating multimedia messages includes an audio communication device, a visual output device, a remote access system and a multimedia message system. The audio communication device is coupled to the remote access system to provide audio input and control signals, and also for receiving the audio portions of multimedia messages. The remote access system also couples the visual output device to the multimedia message system for accessing the visual portions of multimedia messages. The multimedia message system has the capability to generate an image of the message in response to a user request and send that image to the remote access system, and then to the visual output device to the user. The image is augmented to include indices that the user may input via the audio communication device to perform specified actions with the various portions of the message. This functionality is particularly advantageous because it extends the usefulness of the multimedia message system so that it may be used for full access to the system's capabilities with a conventional audio communication device such as a telephone.

36 Claims, 27 Drawing Sheets

U.S. PATENT DOCUMENTS

| | | | | |
|---|---|---|---|---|
| 5,438,436 A | * | 8/1995 | Harris | 358/500 |
| 5,483,580 A | | 1/1996 | Brandman et al. | 379/88.13 |
| 5,504,589 A | * | 4/1996 | Montague et al. | 358/403 |
| 5,630,060 A | * | 5/1997 | Tang et al. | 709/238 |
| 5,802,314 A | * | 9/1998 | Tullis et al. | 709/246 |
| 5,825,854 A | | 10/1998 | Larson et al. | 379/88.14 |
| 5,835,126 A | * | 11/1998 | Lewis | 725/83 |
| 5,892,845 A | * | 4/1999 | Yamanaka et al. | 382/187 |
| 5,959,260 A | * | 9/1999 | Hoghooghi et al. | 178/18.03 |
| 5,963,626 A | * | 10/1999 | Nabkel | 379/142.01 |
| 5,987,528 A | * | 11/1999 | Taylor et al. | 709/328 |
| 5,991,365 A | * | 11/1999 | Pizano et al. | 379/88.13 |
| 6,005,973 A | * | 12/1999 | Seybold et al. | 382/187 |
| 6,157,935 A | * | 12/2000 | Tran et al. | 715/503 |
| 6,173,049 B1 | * | 1/2001 | Malik | 379/207.11 |
| 6,233,318 B1 | * | 5/2001 | Picard et al. | 379/88.17 |
| 6,327,343 B1 | * | 12/2001 | Epstein et al. | 379/88.01 |
| 6,411,685 B1 | * | 6/2002 | O'Neal | 379/88.14 |
| 6,535,586 B1 | * | 3/2003 | Cloutier et al. | 379/88.13 |
| 6,549,612 B2 | * | 4/2003 | Gifford et al. | 379/67.1 |
| 6,564,321 B2 | * | 5/2003 | Bobo, II | 713/168 |
| 6,651,218 B1 | * | 11/2003 | Adler et al. | 715/530 |

* cited by examiner

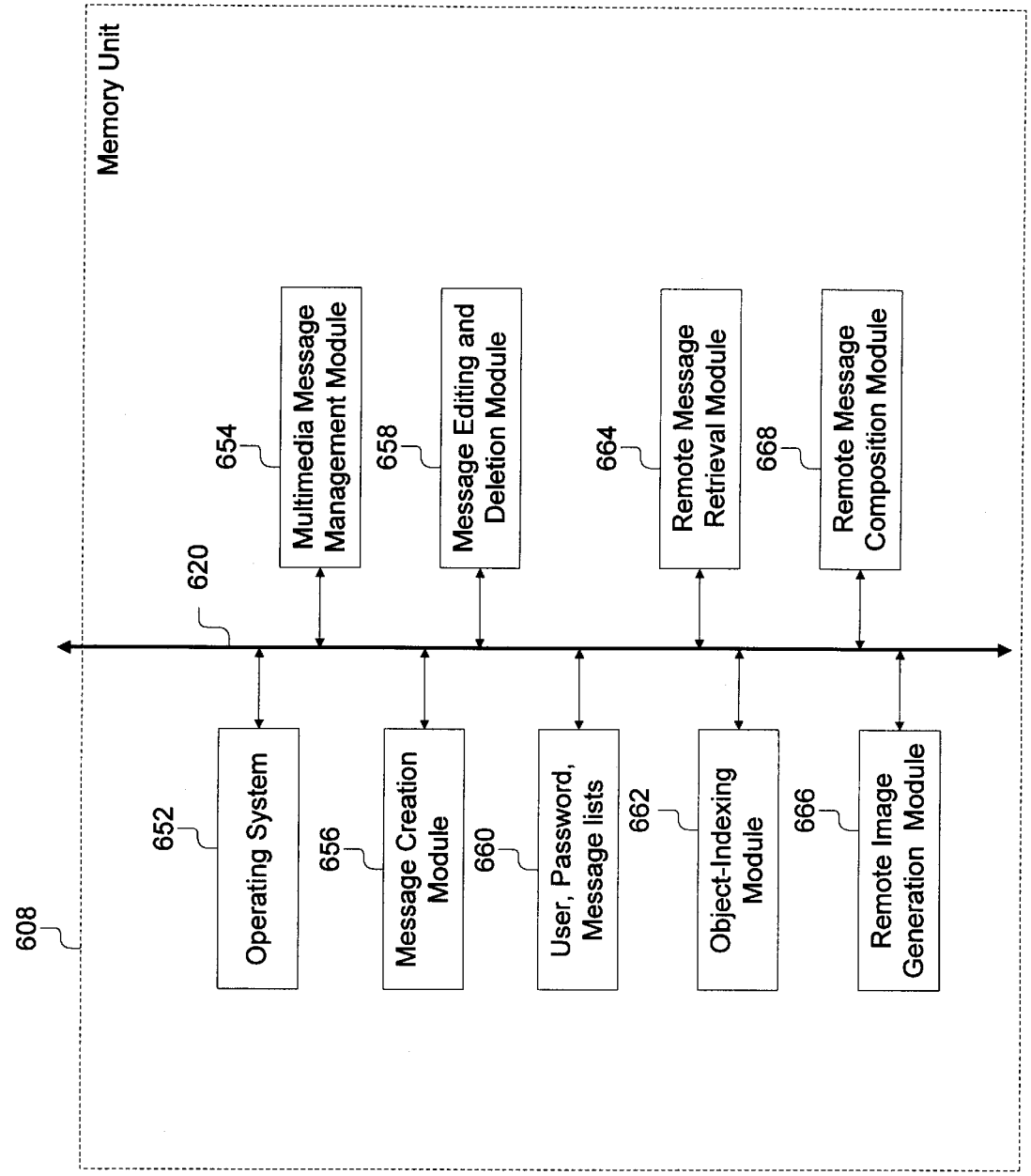

SYSTEMS AND METHODS FOR PROVIDING RICH MULTIMEDIA MESSAGES TO REMOTE USERS USING TELEPHONES AND FACSIMILE MACHINES

CROSS-REFERENCE TO RELATED APPLICATIONS

The present invention relates to U.S. patent application Ser. No. 09/407,010, entitled "Method and Apparatus for Generating Visual Representations for Audio Documents," filed on Sep. 28, 1999, which is incorporated herein by reference. The present invention also relates to U.S. patent application Ser. No. 09/587,591, entitled "Method and System for Electronic Message Composition with Relevant Documents" filed on May 31, 2000. The present invention also relates to U.S. patent application Ser. No. 09/671,505, entitled "System and Method for Automatic Generation of Visual Representations and Links in a Hierarchical Messaging System" filed on Sep. 26, 2000. The present invention also relates to U.S. patent application Ser. No. 10/043,443, entitled "System And Method For Audio Creation and Editing In A Multimedia Messaging Environment" filed on Jan. 9, 2002.

BACKGROUND OF THE INVENTION

1. Field of the Invention

The present invention relates to systems and methods for generating, storing and retrieving multimedia messages that may include audio, text documents, images, web pages (URLs) and video. In particular, the present invention relates to a system and method for providing remote access to such systems. Still more particularly, the present invention relates to a system and method that allows remote access to multimedia messages using conventional telephones and facsimile machines or other conventional display devices.

2. Description of the Background Art

The telephone and voice mail are basic communication tools whose use has become widespread. Audio communication provides the advantage of a rich medium in which expression as well as content can be conveyed. Voice mail systems in which the user is able to create, store, send, forward, and attach audio messages to others are well known, and are part of the communication tools used by many on a daily basis. One problem with such voice mail systems is that they provide for messaging only in the form of audio messages. Yet another shortcoming of voice mail systems is that the user is not given any context or other information for a voice message as can be provided with a graphical display. The only information such systems typically provide is how many messages are in a person's inbox. In most cases, the user is not able to identify whom the messages are from, their duration or whether they are a string of several messages from different speakers. Therefore, in those instances when documents, web pages (URLs), video or other media are the best way to communicate, voice mail systems are unable to receive, send and store messages in these media.

Another tool that has become an integral part of one's daily communication is e-mail. The use and proliferation of e-mail has become widespread because of the speed, cost and ease of use. Initially, e-mail messages were confined to being text only. Thus, e-mail provided only a form of written communication that was much faster than traditional mail. The development of e-mail now allows for the attachment of documents, video clips, audio clips, web pages (URLs) and other media. However, a continuing difficulty with e-mail is that these attachments are difficult to access. Moreover, they are not presented to the user in any meaningful way to convey their content or inter-relationship.

Even more significantly, e-mail that is able to provide such multimedia content can typically only be accessed using a system such as a personal computer. This makes it very difficult to be able to access e-mail when traveling or when a computer is not readily accessible. There are a variety of mobile devices such as wireless telephones, pagers and palm computing devices that attempt to provide remote access to e-mail, however, these devices are not able to effectively provide access to and display e-mail attachments.

Thus, there remains a need for a system and method that is capable of providing remote access to rich multimedia messages. Furthermore, there is a need for a system and method that allows the creation of multimedia messages remotely.

SUMMARY OF THE INVENTION

The present invention overcomes the deficiencies and limitations of the prior art by providing a system and method for receiving and creating multimedia messages. In one embodiment, the system includes an audio communication device, a visual output device, a remote access system and a multimedia message system. The audio communication device is coupled to the remote access system for bi-directional communication with the multimedia message system. The audio communication device is used to provide audio input and control signals, and also for receiving the audio portions of multimedia messages. The remote access system also couples the visual output device to the multimedia message system. The user receives visual portions of multimedia messages from the multimedia message system via the visual output device. The remote access system is coupled or may be part of the multimedia message system. The multimedia message system is capable of creating, receiving, storing and providing multimedia messages that may include audio, text documents, images, web pages (URLs) and video.

In one aspect of the invention, the multimedia message system has the capability to generate an image of the message in response to a user request and send that image to the remote access system, and then through the visual output device to the user. Furthermore, the image is augmented to include indices that the user may input via the audio communication device to perform specified actions with the various portions of the message. This functionality is particularly advantageous because it extends the usefulness of the multimedia message system so that it may be used for full access to the system's capabilities with a conventional audio communication device such as a telephone.

BRIEF DESCRIPTION OF THE DRAWINGS

The present invention will be best be understood with reference to the following drawings in which:

FIG. 6B is a block diagram of a preferred embodiment for a memory of the multimedia message system of FIG. 6A.

DETAILED DESCRIPTION OF THE PREFERRED EMBODIMENTS

Figure 1:
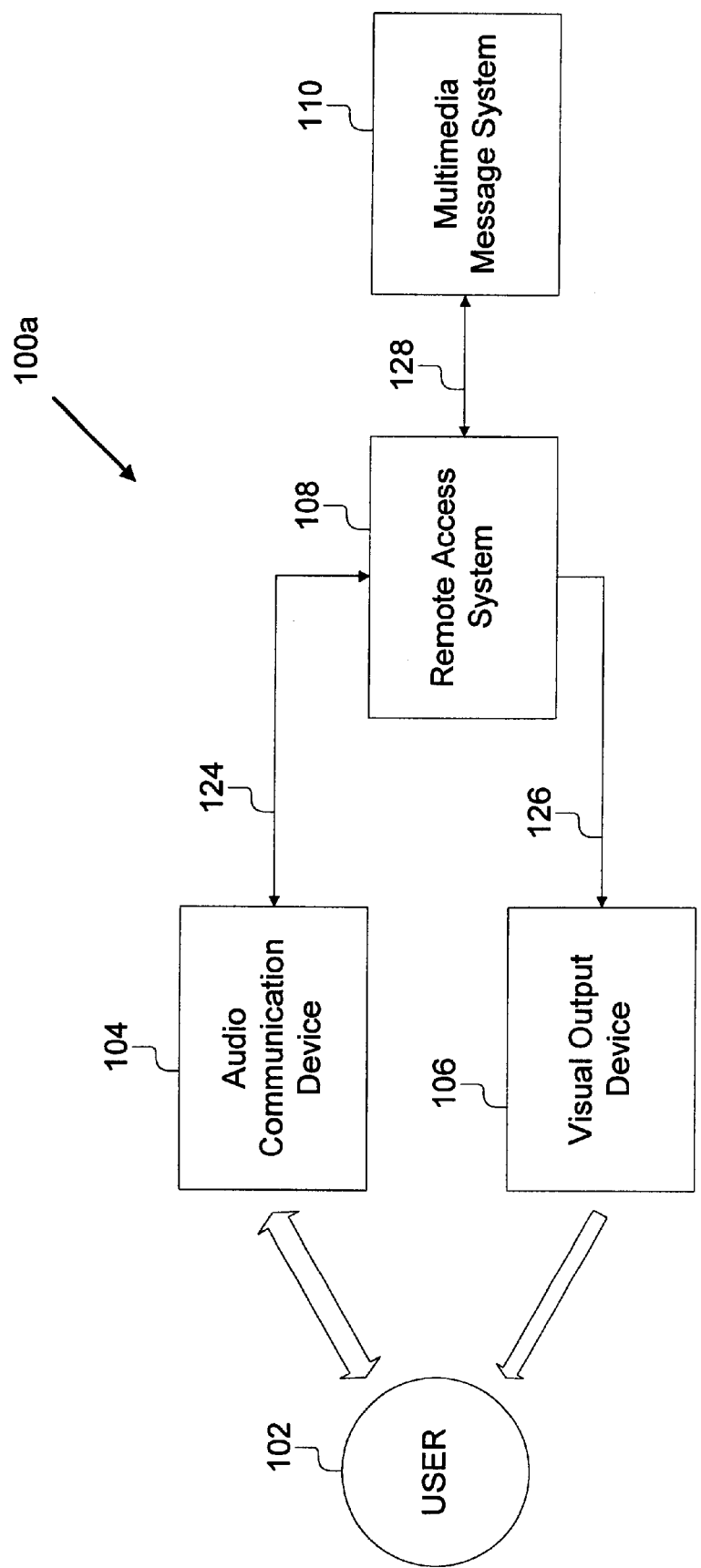
FIG. 1 is a block diagram of a first embodiment of a multimedia message system constructed in accordance with the present invention.
Figure 7:
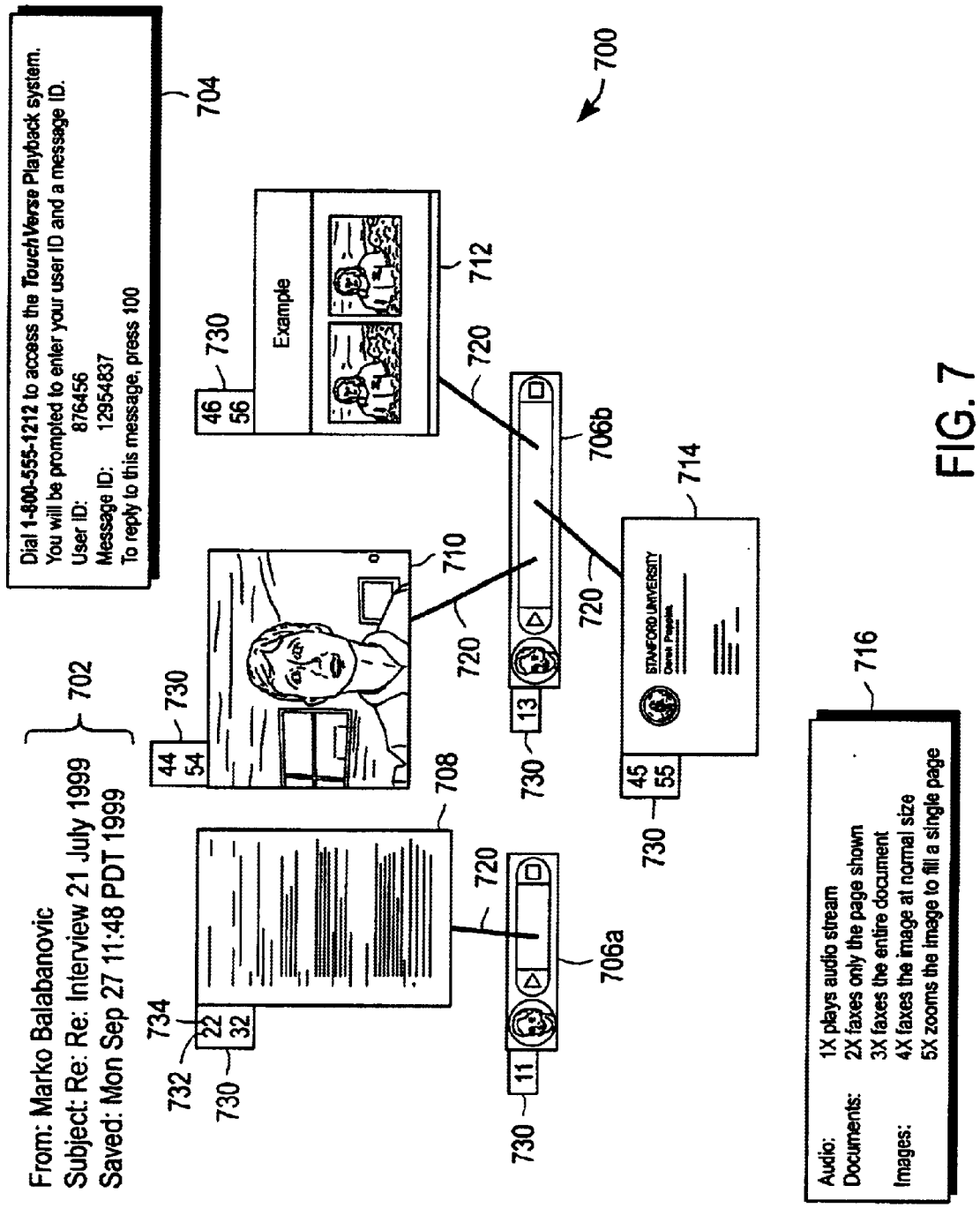
FIG. 7 illustrates a graphical representation of a multimedia message according to the present invention.

Referring now to FIG. 1, there is shown a block diagram of a first embodiment of a multimedia message system 100a constructed in accordance with the present invention. The system 100a preferably includes an audio communication device 104, a visual output device 106, a remote access system 108 and a multimedia message system 110. A signal line 124 couples the audio communication device 104 to the remote access system 108 for bi-directional communication. A signal line 126 couples an output of the remote access system 108 to an input of the visual output device 106. In this first embodiment, the remote access system 108 is separate from the multimedia message system 110 and is coupled thereto by bi-directional signal line 128. The multimedia message system 110 is a computer system for creating, receiving, storing and providing multimedia messages that may include audio, text documents, images and video. An image of an exemplary message 700 is shown in FIG. 7 as will be described later.

The audio communication device 104 is preferably a transceiver device that is capable of: 1) receiving audio signals and converting them to sounds perceptible by a user 102; 2) receiving sounds, converting sounds to audio signal, and sending the audio signal; and 3) generating control signals using a keypad or other input device that is part of the audio communication device 104. Thus, audio communication device 104 receives and sends sounds to and from the user 102, and also receives and sends audio signals to and from the remote access system 108. For example, the audio communication device 104 is preferably an ordinary telephone or a wireless telephone. In such a case, the signal line 124 is the telephone line that connects the telephone to another telephone, a PBX or a computer. Thus, the user 102 is able to receive and send audio signals with a telephone, and is also able to send control signals by sending the touch tones that are output by telephones when the keys of the telephone are depressed. While the audio communication device 104 will subsequently be referred to throughout this application as a telephone, those skilled in the art will recognize that the audio communication device 104 may be any device that provides the functionality just described.

The visual output device 106 is preferably an output device capable of generating an image in any visual form. The visual output device 106 is coupled to the remote access system 108 and is responsive to signals output by the remote access system 108. It is preferably the remote access system 108 that generates the signals and makes sure those signals are in a format acceptable to the visual output device 106. This is done based on the type of visual output device 106 with which the remote access device 108 is communicating. The visual output device 106 is preferably a facsimile machine of a conventional type. Such a facsimile machine is capable of generating an image or printed page in response to a signal from the remote access system 108. Alternate embodiments for the visual output device 106 include: 1) a printer connected to the remote access system 108 by a network; 2) a display device such as a CRT or LED display connected to the remote access system 108 in a conventional manner; 3) a computer coupled to a printer and to the remote access system 108 in a standard fashion; and 4) a palm computing device including a display and a wireless transceiver. Such alternate embodiments will be described below in more detail with reference to FIGS. 4A–4E. However, it should be understood that much of the functionality offered by the present invention can be utilized without having the visual output device 106 as part of the system as will be described specifically with reference to FIG. 4A.

The multimedia message system 110 is preferably a message system for creating, storing, sending and retrieving rich multimedia messages. The messages may include audio, text, video, graphics, etc. The multimedia message system 110 also includes chronicles that refer to a group of messages linked by content. For example, a chronicle may include an initial message and the replies of several addressees as well as all the portions of those messages such as text, video, graphics, etc. For the present invention, chronicles and messages will be considered to be the same. The multimedia message system 110 allows users to create messages, send messages, delete messages, reply to messages, and retrieve messages. An exemplary multimedia message system 110 is disclosed in pending U.S. patent application Ser. No. 09/407,010, entitled "Method and Apparatus for Generating Visual Representations for Audio Documents," filed on Sep. 28, 1999, which is incorporated herein by reference. In particular, the multimedia message system 110 is the TouchVerse messaging system developed by Ricoh Corporation of Santa Clara, Calif. The multimedia message system 110 is preferably a computer or server that includes programs and routines for providing the messaging functionality described above and in the referenced patent application. For example, the server could be similar to a web server that stores messages (in contrast to web pages) and makes the messages accessible to others. The server is coupled to the remote access system 108 in a conventional manner such as by a network connection, the Internet, a modem, or a dedicated connection. The remote access system 108 is coupled or may be part of the multimedia message system 110 (see FIG. 5).

The remote access system 108 provides the interface between the multimedia message system 110 and the audio communication device 104 and the visual output device 106. The remote access system 108 also includes a plurality of units, as will be described in more detail below with reference to FIG. 3, that enable the creation of messages and the retrieval of audio and visual portions of messages under the control of the audio communication device 104. The remote access system 108 preferably has a plurality of input/output ports for connecting (by the various signal lines 124, 126, 128) to these other systems 110 and devices 104, 106. For example, the remote access system 108 interfaces with the audio communication device 104 in a manner similar to the operation of a voice mail system for the creation, storage, sending, and retrieval of audio message portions. The keypad of the audio communication device 104 may be used as a control input in a manner like that currently available with voice mail systems. Moreover, the functionality provided in part by the multimedia message system 110 and the remote access system 108 effectively serves as a translator to translate the control input into a format understandable by the multimedia message system 110 and to pass audio signals between the multimedia message system 110 and the audio communication device 104. Similarly, the remote access system 108 preferably interfaces with multimedia message system 110 in a similar manner such as over a network or by direct calls or interrupts to the multimedia message system 110. Finally, the remote access system 108 preferably interfaces with the visual output device 106 to use it as a means for providing visual output to the user 102. This can be done either by generating a printed image or by providing an image on a screen depending on the form that the visual output device 106 takes.

Figure 2:
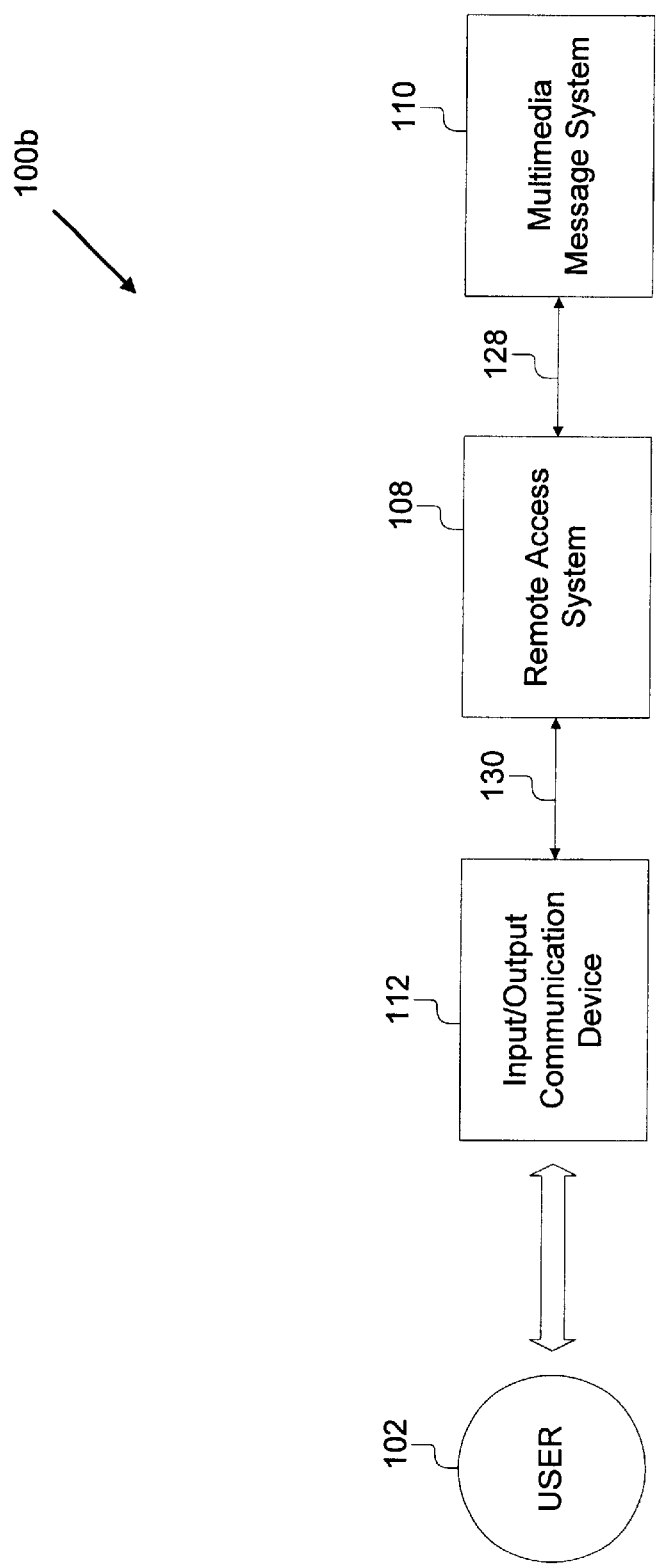
FIG. 2 is a block diagram of a second, alternate embodiment of a multimedia message system constructed in accordance with the present invention.

Referring now to FIG. 2, a block diagram of a second, alternate embodiment of a multimedia message system 100b of the present invention is shown. The second embodiment of the multimedia message system 100b comprises an input/output communication device 112, the remote access system 108 and the multimedia message system 110. For convenience and ease of understanding like reference numbers are used for like components and have the same functionality as has been described above. In particular, the remote access system 108 and the multimedia message system 110 are similar to those previously described. The second embodiment of the system 100b is different because the input/output communication device 112 replaces the audio communication device 104 and the visual output device 106. The input/output communication device 112 is preferably a transceiver device that is capable of: 1) receiving audio signals and converting them to sounds perceptible by a user 102; 2) receiving sounds, converting sounds to audio signal, and sending the audio signal, 3) generating control signals using an associated keypad or other input device; and 4) generating an image viewable by a user 102. For example, the input/output communication device 112 is a cell phone having a LCD display and a message capability. The input/output communication device 112 is coupled to the remote access system 108 by a bi-directional signal line 130 to send and receive audio signals, send control signals, and receive data and image displayable on the LCD display. For example, the signal line may be a wireless communication link provided in a conventional manner for cell phones. While the present invention will be subsequently described primarily with reference to the first embodiment 100a, and not this embodiment 100b, those skilled in the art will recognize how the present invention may also be adapted for used with the input/output communication device 112.

Figure 3:
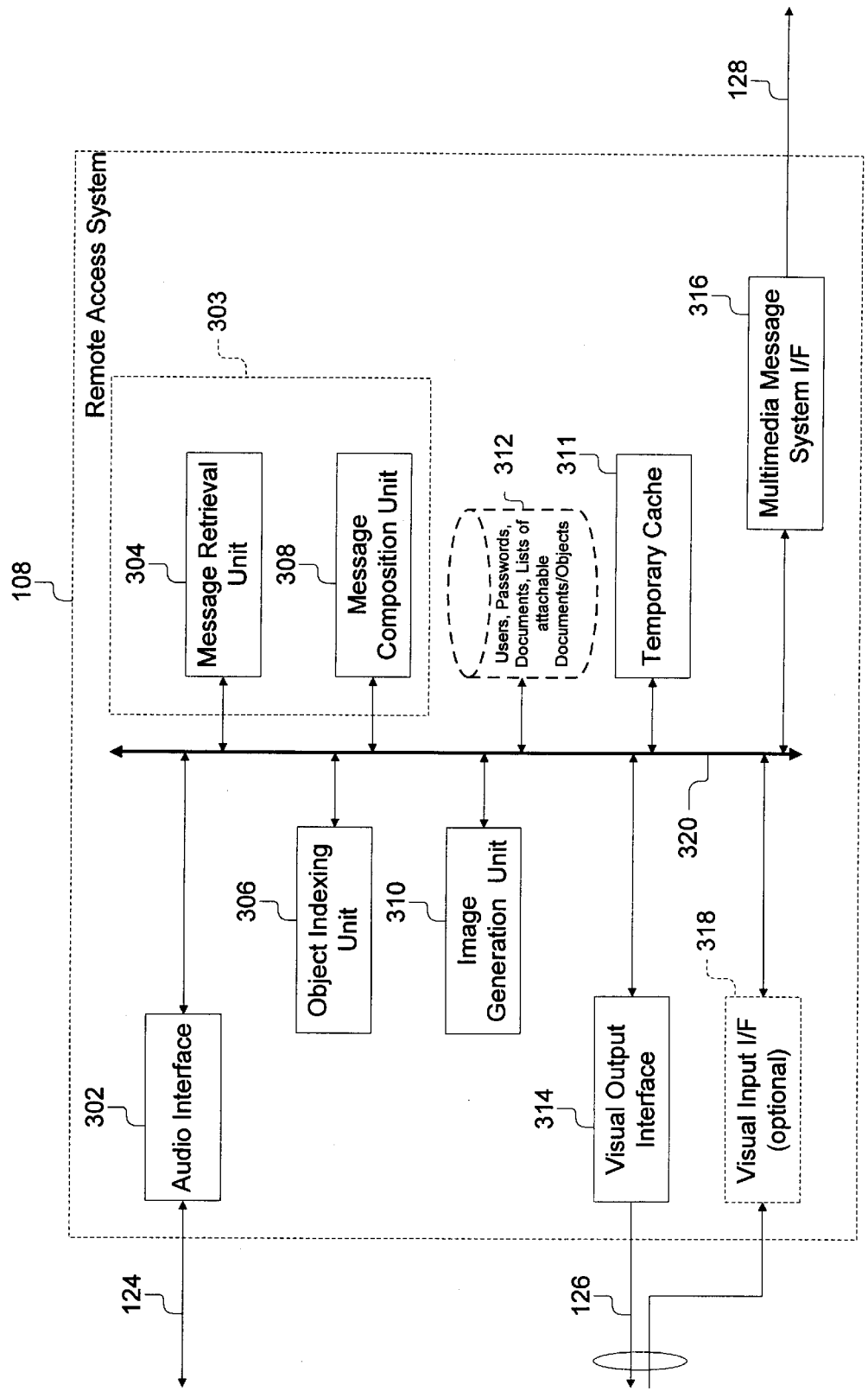
FIG. 3 is a block diagram of a preferred embodiment of a remote access system for a multimedia message system constructed in accordance with the present invention.

Referring now to FIG. 3 as well as FIGS. 1 and 2, a block diagram of a preferred embodiment of the remote access system 108 for the message system 100a/100b is shown. The remote access system 108 preferably comprises a plurality of interfaces 302, 314, 316, 318, a message retrieval unit 304, an object indexing unit 306, a message composition unit 308, an image generation unit 310, a temporary cache or memory 311, and a database of users, user profiles, passwords, objects, and lists of attachable documents/objects 312. As has been noted above, the remote access system 108 interconnects and provides the communication between the multimedia message system 110, the audio communication device 104 and the visual output device 106 or the input/output communication device 112. Essentially, the remote access system 108 translates the control inputs from the audio communication device 104 into a format understandable by the multimedia message system 110, passes audio signals between the multimedia message system 110 and the audio communication device 104, and passes visual signals to the visual output device 106. This is accomplished primarily by a database communication and retrieval unit 303 that is formed of the message retrieval unit 304 and the message composition unit 308. The plurality of interfaces 302, 314, 316, 318, the message retrieval unit 304, the object-indexing unit 306, the message composition unit 308, the image generation unit 310, and the database of users, user profiles, passwords, objects, and lists of attachable documents/objects 312 are coupled to each other by a bus 320 in a conventional manner for passing data and control signals. The database of users, user profiles, passwords, objects, and lists of attachable documents/objects 312 is preferably part of the multimedia message system 110, and is therefore, shown in FIG. 3 with dashed lines to represent an alternate embodiment where the database 312 is part of the remote access system 108.

The plurality of interfaces 302, 314, 316, 318 are responsible for sending and receiving signals to and from respective other devices 104, 106, 110.

The audio interface 302 is coupled to line 124 and to the bus 320. The audio interface 302 preferably includes buffers for storing signals, as well as translators for converting audio signals on a telephone line to a digital format usable by computers. The audio interface 302 receives audio signal and control signals such as from a telephone handset, converts them to a digital format, and sends them to other units 304, 306, 308, 310 and/or the multimedia message system 110 for further processing. The audio interface 302 could also include audio processing of a conventional type such as voice recognition and voice processing systems for voice mail. The audio interface 302 is also responsive to the other unit 304, 306, 308, 310 and the multimedia message system 110 to generate and send audio signals.

The visual output interface 314 is coupled to line 126 and to the bus 320 for communication with the visual output device 106. The visual output interface 314 preferably includes buffers for storing signals, as well as translators for converting data and control signals from a digital format to the format used by the visual output device 106. The visual output interface 314 also includes hardware for communicating on the signal line 126 conventionally used by the visual output device 106. Thus, the visual output interface 314 may include a network controller, a serial or parallel port controller, or a fax modem. The visual output interface 314 communicates with and is primarily responsive to the image generation unit 310. For example, the visual output interface 314 converts signals and data from the image generation unit 310 into any one of: 1) a fax signal if the visual output device 106 is a fax machine; 2) a printer control language file or postscript file if the visual output device 106 is a directly connected printer; 3) a series of packets if the visual output device 106 is connected via a network; or 4) properly formatted frames if the visual output device 106 is directly connected to a CRT or flat panel display.

In an alternate embodiment, the remote access system 108 may also include a visual input interface 318 for communication and coupling with a visual output device 106 that includes the capability to generate and send signals in addition to just receiving such signal. For example, a personal digital assistant (PDA) such as Palm brand computing devices or two-way pagers allows such bi-directional transfer of data and control signals. In such a case, the remote access system 108 is adapted to include the visual input interface 318. The visual input interface 318 converts received signals and provides them to other units 304, 306, 308, 310 and the multimedia message system 110. Those skilled in the art will recognize that this is a simple conversion of the signals from a particular digital format to another.

The multimedia message system interface 316 is coupled to line 128 and to the bus 320. The multimedia message system interface 316 preferably includes buffers for storing signals, as well as translators for converting the commands and data from the units 304, 306, 308, 310 of the remote access system 108 to a proper input format for the multimedia message system 110. Inversely, the multimedia message system interface 316 includes translators for converting the commands and data from multimedia message system 110 so that they are usable by the units 304, 306, 308, 310 of the remote access system 108. The multimedia message system interface 316 may communicate using a network protocol or even as different streams or threads running on a single processor to pass information between the multimedia message system 110 and the units 304, 306, 308, 310.

In addition to the plurality of interfaces 302, 314, 316, 318, the remote access system 108 includes a number of units 304, 306, 308, 310 that enable remote access to the multimedia message system 110. The database communication and retrieval unit 303 is made up of the message retrieval unit 304 and the message composition unit 308. These units 303, 304 and 308 control and handle the retrieval of messages and other information from the multimedia messaging system 110 and delivery of such information to the audio interface 302 and the visual output interface 314. These units 303, 304 and 308 also control and handle the storage of messages and other information in the multimedia messaging system 110 and the receipt of such messages and information from the audio interface 302 and the visual input interface 318. In performing these operations, these units 303, 304 and 308 use the temporary cache 311 for storing messages, objects, passwords, user identification numbers, etc. as needed before transfer to and from the interfaces 302, 314, 316, 318.

The message retrieval unit 304 is also coupled to the bus 320 for communication with the audio interface 302, the multimedia message system interface 316, the object-indexing unit 306, and the image generation unit 310. The message retrieval unit 304 interacts with these components as will be described below with reference to FIGS. 8, 9A, 9B, 10, 12A, 12B, and 13 to retrieve messages and their visual portions. The message retrieval unit 304 preferably controls the interaction and signal passing between the audio interface 302 and multimedia message system interface 316 for passing the audio signals. The message retrieval unit 304 is also responsive to control signals received via the audio interface 302 to undertake additional steps and solicit more information from the user, necessary to identify and deliver audio message portions or objects as well as visual message portions or objects. The message retrieval unit 304 also processes signals from the multimedia message system interface 316 and provides the information necessary for the image generation unit 310 to work with the multimedia message system 110 and the visual output interface 314 and send images to the user 102.

The object-indexing unit 306 is also coupled to the bus 320 for communication with the multimedia message system interface 316, the message retrieval unit 304 and the message composition unit 308. The object-indexing unit 306 interacts with these components as will be described below with reference to FIGS. 8, 9A, 9B, 10, 12A, 12B, and 13 to translate signals input via the audio interface 302 to corresponding commands and references to objects that are portions of each message. The object-indexing unit 306 is also used to generate and store unique indices that become part of an image of the message. The object-indexing unit 306 preferably stores these indices for current and future use in accessing the message's portions such as in the database 312 or in a database of the multimedia messaging system 110. This is described in more detail below with reference to FIGS. 11A and 11B. These indices are in turn input by the user 102 to specify commands and identify objects corresponding to the commands. Other units 304, 308, 310 and interfaces 302, 314, 316, 318 use the object-indexing unit 306 to translate indices to specific actions and objects or files.

The message composition unit 308 is also coupled to the bus 320 for communication with the audio interface 302, the multimedia message system interface 316, and the object-indexing unit 306. The message composition unit 308 interacts with these components as will be described below with reference to FIG. 14 to create new messages. Using audio input and controls, the user 102 can create reply or original messages that include pre-existing objects (video clips, documents, images, etc.). The message composition unit 308 translates the data and control signal received via the audio interface 302 using the object-indexing unit 306 into commands and data understandable to the multimedia message system 110. The multimedia message system 110 in response is able to create and store such remotely created messages.

The image generation unit 310 is responsive to the message retrieval unit 304 and receives and sends data and images from the multimedia message system 110 to the visual output interface 314. The operation of the image generation unit 310 can be best understood with reference to FIGS. 9B, 10 and 13. The image generation unit 310 communicates with the multimedia message system 110 to receive visual message objects or portions and is responsible for the delivery of the objects to the user 102 according to the type of visual output device that the user 102 has specified or has available.

The database of users, user profiles, passwords, objects, messages and lists of attachable document/objects 312 is shown as being connected to the bus 320 for access by the various units 304, 306, 308, 310 and interfaces 302, 314, 316, 318. Those skilled in the art will recognize that this information is preferably stored as part of the multimedia message system 110, and thus be accessible through the multimedia message system interface 316. Those skilled the art will realize that this database 312 may be part of the multimedia message system 110 and cached locally as part of the remote access system 108. The database 312 preferably stores user identification numbers and passwords used for comparison and authorization for remote access, objects or those constituent portions that form the messages, and lists of attachable objects or documents. Such a list of attachable objects or documents also has object indices for remotely using the objects.

Referring now to FIGS. 4A–4E, various exemplary embodiments of possible configurations of the remote access system 108 and various conventional devices as the audio communication device 104 and the visual output device 106 are shown. These figures are used to illustrate various different ways in which the methods of the present invention may be used in whole or in part to access any part of a multimedia message.

Figure 4A:
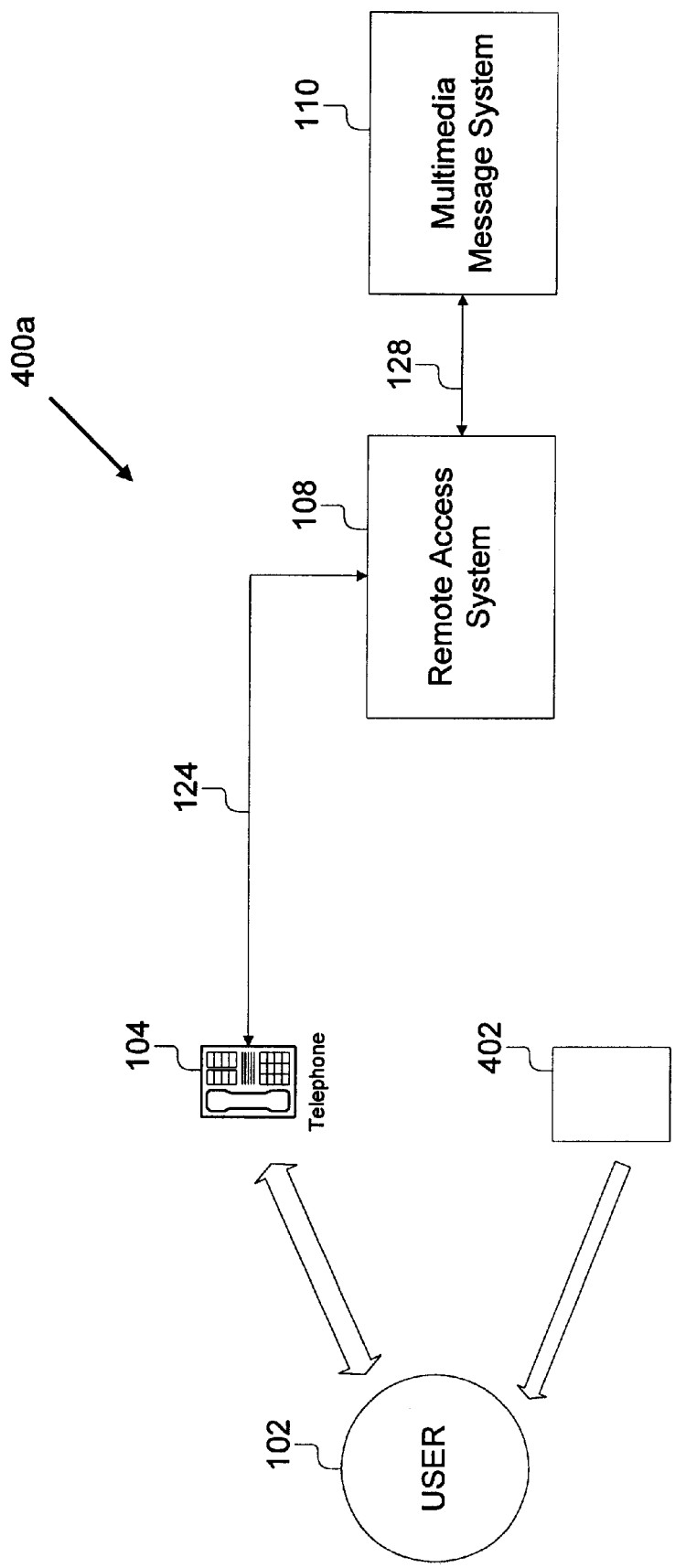
FIGS. 4A–4E are block diagrams of various exemplary embodiments of possible configurations of the remote access system for a multimedia message system using various conventional devices as the audio communication device and the visual output device.

FIG. 4A illustrates an example where the audio communication device 104 is a conventional telephone and there is no visual output device 106. In such a case, the user 102 may have printed an image of a message on paper 402 using a computer or other apparatus that is part of the multimedia message system 110. The user may then leave the office and take the paper 402. Using only the telephone 104 and the paper 402, the user 102 may access the remote access system 108 to retrieve the message. Since there is no visual output device 106, user 102 is only able to listen to or add audio portions of to the message.

Figure 4B:
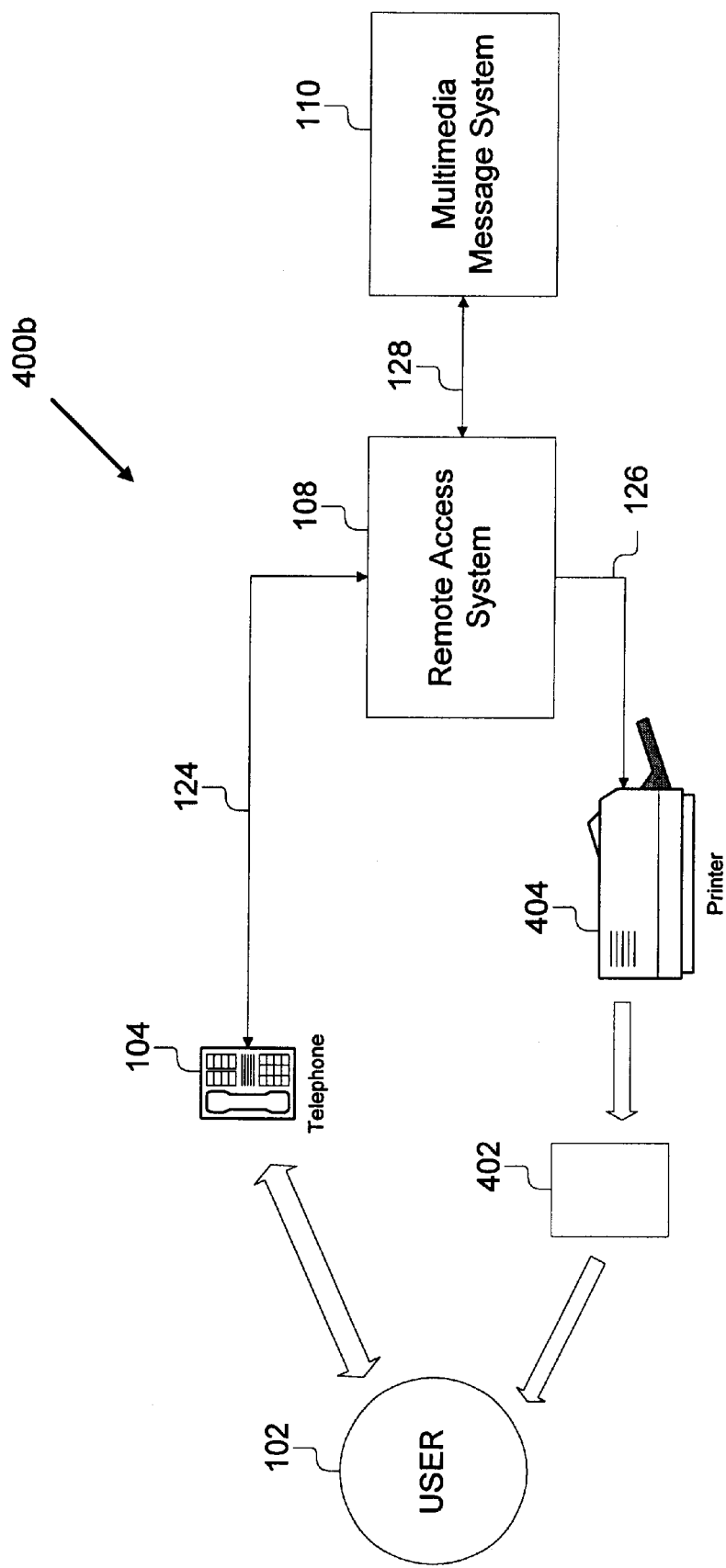

FIG. 4B illustrates an example where the audio communication device 104 is a telephone and the visual output device 106 is a printer 404. The printer 404 is linked in some conventional manner to the remote access system 108. In this situation, the user 102 is assumed to be away from the office, and thus does not have normal access to the multimedia message system 110, but is at a remote location that has a telephone 104 and a printer 404. The user 102 is able to access the multimedia message system 110 for audio messages via the telephone 104. The user 102 is also able to retrieve copies of visual portions of the message by printing them on the printer 404. For example, the paper 402 having an image of the message may be printed and used to access additional portions of the message as will be described in more detail below.

Figure 4C:
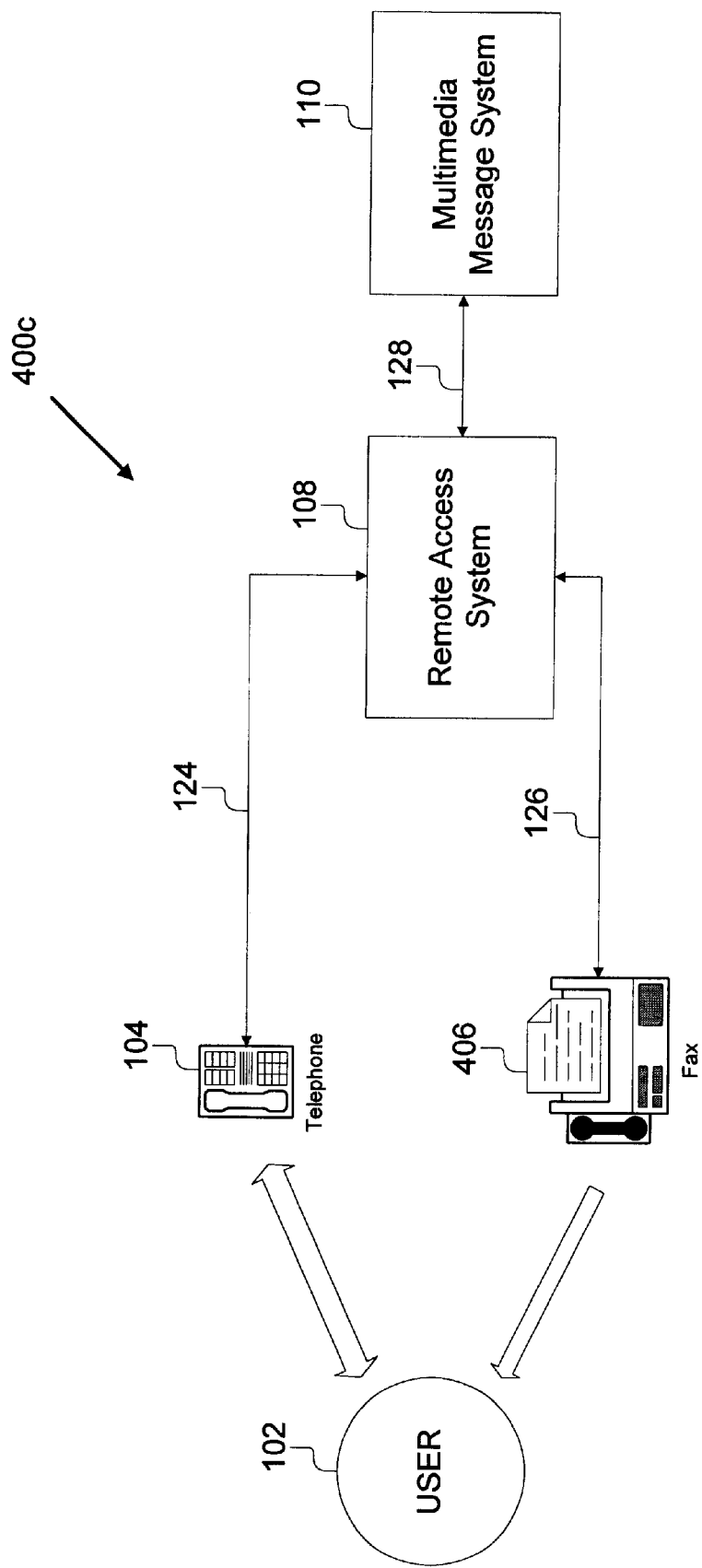

FIG. 4C illustrates an example where the audio communication device 104 is a telephone and the visual output device 106 is a fax machine 406. A telephone line couples the fax machine 406 in a conventional manner to the remote access system 108. In this situation, the user 102 is assumed to be away from the office such as at a hotel. The user 102 is able to remotely access the functionality provided by the multimedia message system 110. The user 102 is able to access the multimedia message system 110 for the creation, retrieval and deletion of audio messages via the telephone 104. The user 102 is also able to retrieve copies of visual portions of the message by having then faxed to the fax machine 406. Both the image of the message, including indices, as well as the non-audio portions or objects contained in the message can be faxed by the multimedia message system 110 to the fax machine 406 for view by the user 102. The fax machine 406 may also be used to send visual objects such as images and documents to the multimedia messaging system 110. Once input to the multimedia messaging system 110, these objects may be resent, added, deleted or similarly manipulated just like other visual objects already stored in the system.

Figure 4D:
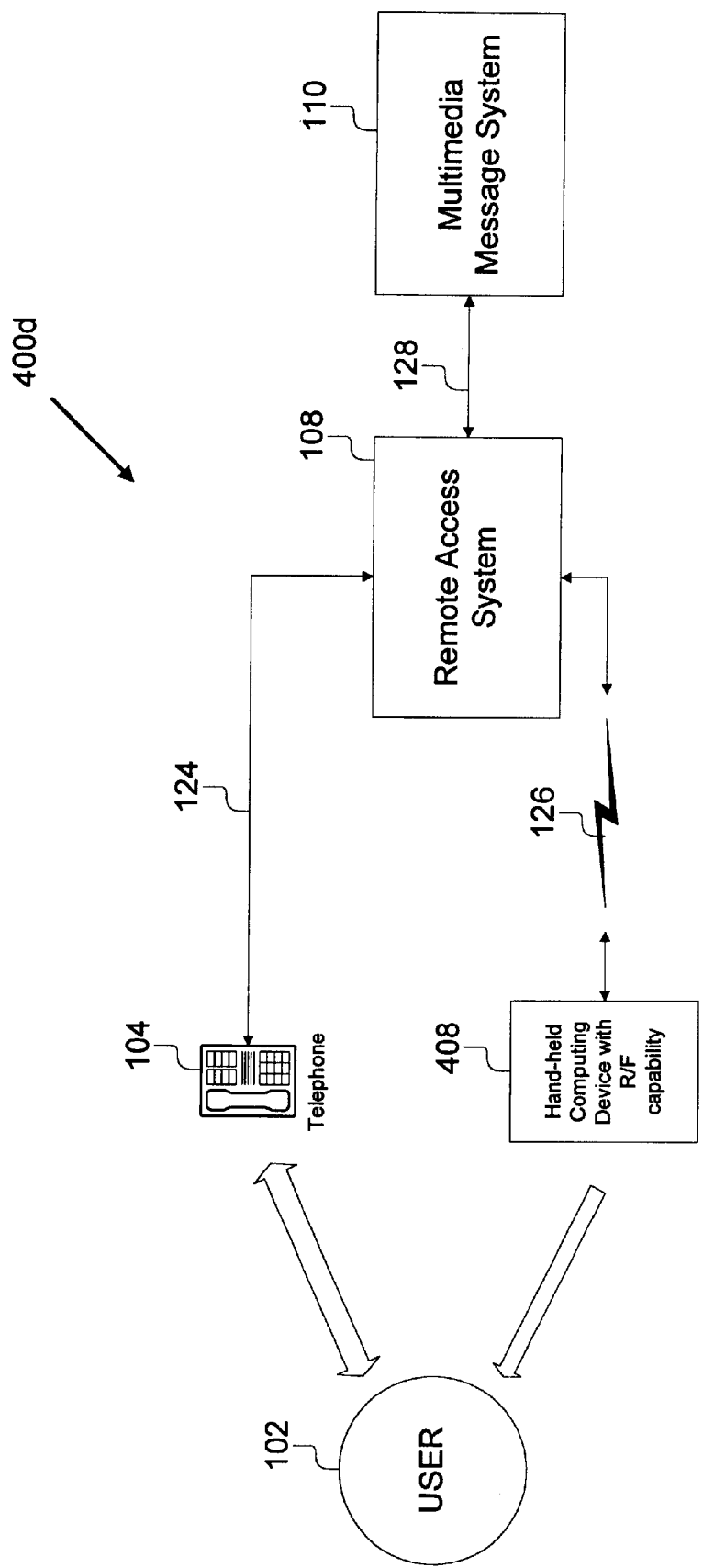

FIG. 4D illustrates an example where the audio communication device 104 is a telephone and the visual output device 106 is a hand-held computing device 408 that includes wireless communication capability. For example, the hand-held computing device 408 could be a personal digital assistant (PDA) such as the Palm VII by 3Com. The hand-held computing device 408 communicates with the remote access system 108 via an RF link 126. In this case, the user 102 is assumed to be away from the office but has access to a telephone and carries his hand-held computing device 408 with him. The user 102 is able to remotely access the functionality provided by the multimedia message system 110 using the telephone to retrieve audio message portions, send audio messages and send control signals. With the display portion of the hand-held computing device 408, the user 102 is able to view and to retrieve copies of visual portions of the message. Furthermore, the user 102 may use the input mechanism of the hand-held computing device 408 to send control signals and visual objects to the remote access system 108. When using a PDA 408 or other interactive display with a telephone 104 for creating new messages, the user 102 can indicate a reference by tapping the reference on the display while recording audio on the phone. The system 100a advantageously keeps track of the timing and uses it for creating references. Examination of the audio content might be combined with the timing (e.g., "this document") to improve reference location. Furthermore, the gestures or other inputs provided by a PDA 408 could be translated into any variety of control signals as will be understood by one skilled in the art. It should also be noted that while the methods are described below primarily with reference to use with passive devices such as printers and fax machines, the user interface and procedures of the methods are slightly different for interactive displays (which might initiate document retrieval events and other control inputs) as will be understood to those skilled in the art.

Figure 4E:
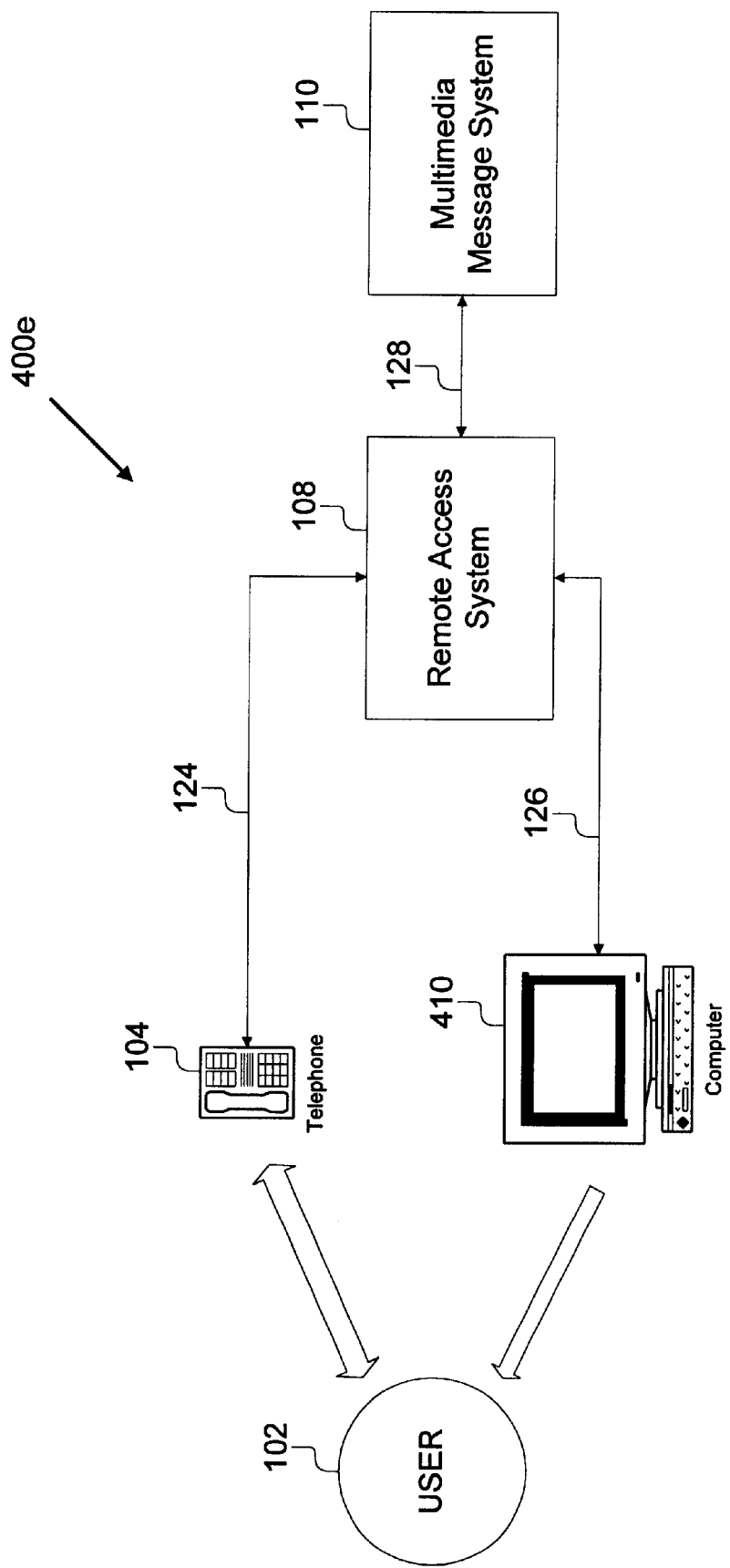

FIG. 4E illustrates an example where the audio communication device 104 is a telephone and the visual output device 106 is a computer 410 connected to the remote access system 108 by the Internet or direct dial in. In this case, the user has left the office, but has a telephone and possibly a home computer 410 to access the multimedia message system 110. The telephone 104 is used for the audio portions of messages, and the display of the computer 410 can be used to obtain the visual message portions. If the computer display is a web browser, clicking on "hyperlinks" within a display of the computer 410 could have the same control and reference function (e.g., "this document") as tapping the PDA 408 in FIG. 4D.

Figure 5:
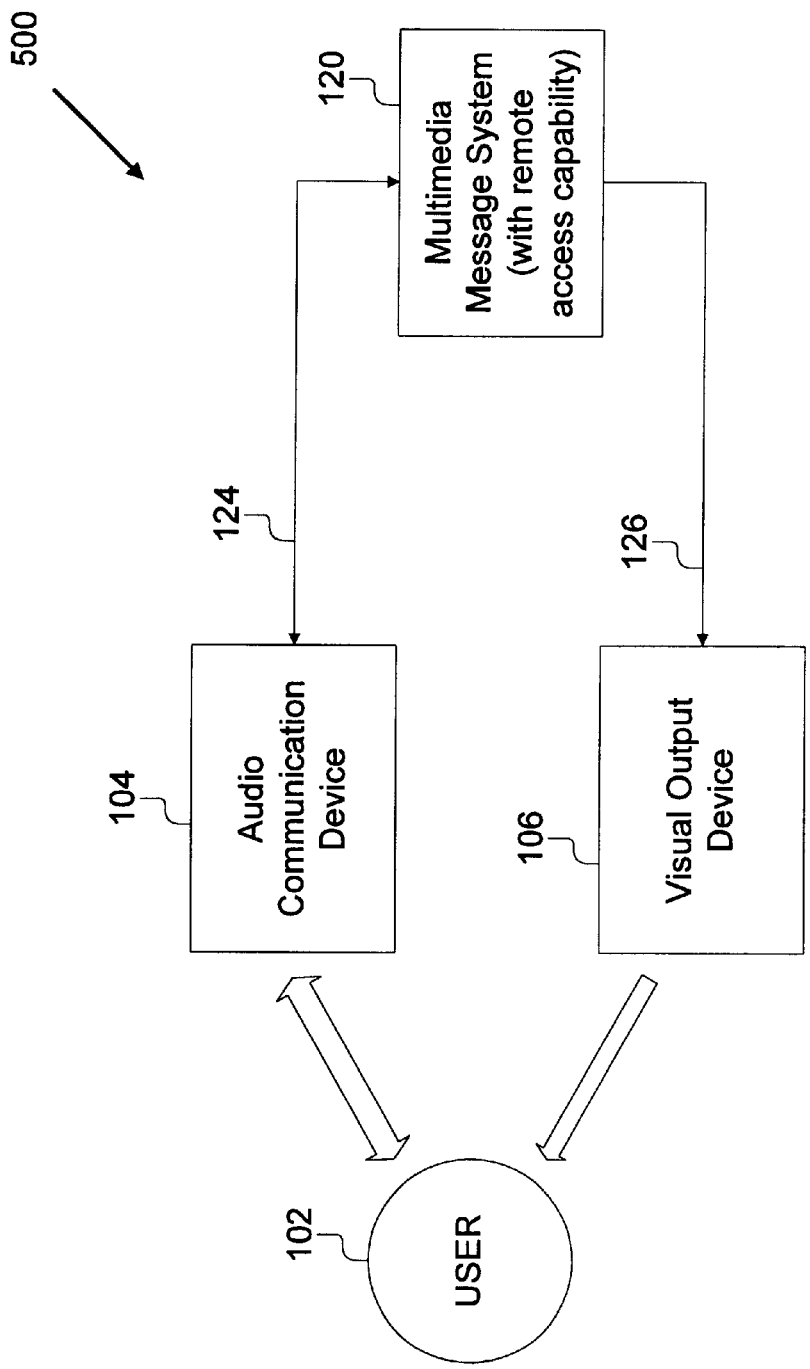
FIG. 5 is a block diagram of a third and preferred embodiment of the multimedia message system constructed in accordance with the present invention.

FIG. 5 is a block diagram of a third and preferred embodiment of the multimedia message system 120 constructed in accordance with the present invention. In this preferred embodiment, the remote access system is integrated as a part of the multimedia message system. More particularly, the remote access capability is provided by adding software for operation of the multimedia messaging with the functionality that has been described above.

Some portions of the detailed descriptions that follow are presented in terms of algorithms and symbolic representations of operations on data bits within a computer memory 608. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. The apparatus may be specially constructed for the required purposes, or it may comprise a general-purpose computer (see FIGS. 5, 6A, 6B) selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 6A:
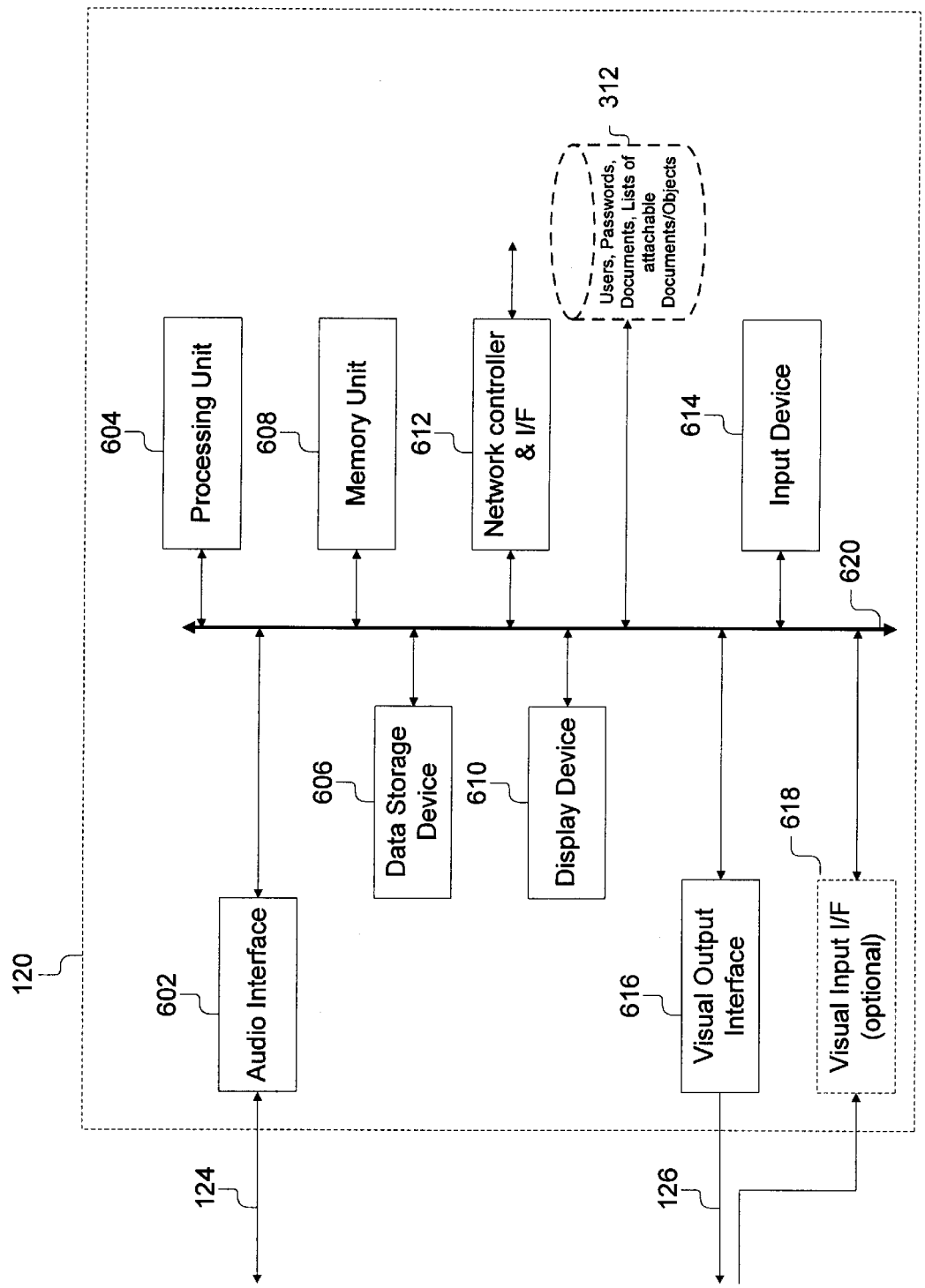
FIG. 6A is a block diagram of a preferred embodiment of a multimedia message system including remote access capability in accordance with the present invention.

Referring also to FIG. 6A is a block diagram of a preferred embodiment of a multimedia message system 120 including remote access capability is shown in more detail. The remote capable multimedia message system 120 preferably comprises an audio interface 602, a processing unit 604, a data storage device 606, a memory unit 608, a display device 610, a network controller 612, an input device 614, a visual output interface 616, and optionally a visual input interface 618 all of which are communicatively coupled to system bus 620.

The processing unit 604 processes data signals and may comprise various computing architectures including a complex instruction set computer (CISC) architecture, a reduced instruction set computer (RISC) architecture, or an architecture implementing a combination of instruction sets. Although only a single processor is shown in FIG. 6A, multiple processors may be included.

Data storage device 606 stores data and instructions for processing unit 604 and may comprise one or more devices including a hard disk drive, a floppy disk drive, a CD-ROM device, a DVD-ROM device, a DVD-RAM device, a DVD-RW device, a flash memory device, or some other mass storage device known in the art.

The display device 610 comprises any device equipped to display electronic images and data as described herein. Display device 610 may be, for example, a cathode ray tube (CRT), liquid crystal display (LCD), or any other similarly equipped display device, screen, or monitor. In one embodiment, display device 610 is equipped with a touch screen in which a touch-sensitive, transparent panel covers the screen of display device 610.

The input device 614 is preferably a keyboard coupled to communicate information and command selections to the processing unit 604, and a cursor control device equipped to communicate positional data as well as command selections to the processing unit 604. The cursor control device may include a mouse, a trackball, a stylus, a pen, cursor direction keys, or other mechanisms to cause movement of a cursor.

The network controller 612 links processing unit 604 to a network that may include multiple processing systems. The network of processing systems may comprise a local area network (LAN), a wide area network (WAN) (e.g., the Internet), and/or any other interconnected data path across which multiple devices may communicate.

System bus 620 represents a shared bus for communicating information and data throughout the multimedia message system 120. System bus 620 may represent one or more buses including an industry standard architecture (ISA) bus, a peripheral component interconnect (PCI) bus, a universal serial bus (USB), or some other bus known in the art to provide similar functionality.

The audio interface 602, visual output interface 616 and optionally visual input interface 618 have been described above with reference to FIG. 3. This description will not be repeated here. These interfaces 602, 616, 618 provide the same functionality for communication and interaction with the processing unit 604.

Memory unit 608 may store instructions and/or data that may be executed by processing unit 604. The instructions and/or data may comprise code for performing any and/or all of the techniques described herein. Memory unit 608 may be a dynamic random access memory (DRAM) device, a static random access memory (SRAM) device, or some other memory device known in the art.

FIG. 6B shows the memory unit 608 of the multimedia message system 120 of FIG. 6A in more detail. The memory unit 608 preferably comprises an operating system 652, a multimedia message management module 654, a message creation module 656, a message editing and deletion module 658, a memory 660 storing user identification numbers, passwords, objects identification numbers, and lists of attachable objects, an object indexing module 662, a remote message retrieval module 664, a remote image generation module 666 and a remote composition module 668. These modules 652–668 are coupled by bus 620 to the processing unit 604 for communication and cooperation to provide the system 120 for multimedia messaging that further provides a capability for the user to access messages using a conventional telephone or any available visual output device 106.

The operating system 652 is preferably one of a conventional type such as, WINDOWS®, SOLARIS® or LINUX® based operating systems. Although not shown, the memory unit 608 may also include one or more application programs including, without limitation, word processing applications, electronic mail applications, spreadsheet applications, and web browser applications.

The multimedia message management module 654, the message creation module 656, the message editing and deletion module 658, in this embodiment, are programs or instructions for controlling the processing unit 604 to provide the basic functionality of a multimedia message system. The functionality provided by these modules is described in pending U.S. patent application Ser. No. 09/407,010, entitled "Method and Apparatus for Generating Visual Representations for Audio Documents," filed on Sep. 28, 1999, as has been noted above. The multimedia message management module 654 is different in that it also controls the interaction of these modules 656, 658 with the remote access modules 662, 664, 666, 668. This interaction and control will be described below along with the flowcharts. The remaining modules 656 and 658 are also responsive to the remote access modules 662, 664, 666, 668 as necessary to create, edit, delete and retrieve multimedia messages.

The object-indexing module 662, the remote message retrieval module 664, the remote image generation module 666 and the remote message composition module 668 are similar in functionality to the corresponding units 306, 304, 310 and 308 that have been described above. However, the modules 662, 664, 666, 668 are programs or instructions executable by the processing unit 604 to provide the remote functionality as noted above and as will be fully detailed with the flowcharts of FIGS. 8–14.

Referring now to FIG. 7, a graphical representation of a multimedia message or chronicle 700 is shown. The ability to generate such an image of the multimedia message 700 is a key aspect of the present invention because it enables remote access. The viewable or printable image of the message 700 preferably comprises a number of informational components such as a message header 702, a remote message access information block 704, a plurality of message portions or objects graphically depicted 706a, 706b, 708, 710, 712, 714, a key of action-to-index correspondence 716, one or more links 720 between message objects 706a, 706b, 708, 710, 712, 714, and one or more indices 730 corresponding to each message portion 706a, 706b, 708, 710, 712, 714 that is remotely retrievable. By providing a graphical view of the image, the present invention is particularly advantageous because the user 102 is able to more readily understand the context and interrelationship between the messages, portions or objects.

The message header 702 preferably provides basic information about the message 700 such as whom the message is from, the subject of the message and the date when the message was last saved. This information is similar to that which you would find for e-mail messages and provides a convenient basis for the user 102 to identify a message in which he is interested.

The remote message access information block 704 provides information essential for the user 102 to access the message remotely. In particular, the remote message access information block 704 includes the telephone number that the user must dial to gain access to the multimedia message system 110. The remote message access information block 704 also includes a unique user identification number and a unique message identification number that the user 102 can enter via the keypad of the telephone to indicate to the system 100a who the user is, and the specific message that the user 102 wants to access. In alternate embodiments, the remote message access information block 704 may contain a URL or a barcode that could be faxed or other index that could be input via the telephone, fax machine or PDA to indicate the message that the user 102 wants to access. The remote message access information block 704 may also contain other information for navigating or accessing the system 100a such as how to reply to a message as shown in FIG. 7.

The plurality of message portions or objects 706a, 706b, 708, 710, 712, 714 are preferably graphically depicted, and thumbnail images are created for each type. Since the message 700 may include any one or groups of audio messages, documents, photographs, images, and video clips, the system 100a preferably a generates a thumbnail image of each so that the user 102 can immediately identify the type of objects that form the message. The example shown in FIG. 7 has a message portion of each type including two audio portions. The audio portions 706a, 706b are preferably graphically depicted as part of the image in a manner similar to how they would be displayed on a computer display that was not remotely connected. The audio portions 706a, 706b preferably include an image of the person leaving the message and an icon representing a relative duration of the audio message. Document 708 is represented by a thumbnail image of the first page of the document. Such documents 708 may simply be text or may be displayed in proprietary application formats, as the user would see the first page of the document. Photographs 710 and images 714 are represented by a thumbnail image of the photograph or image. Video clips are represented by a thumbnail image of a frame of the video clip. Thus, as can be seen in FIG. 7, simply by viewing the multimedia message 700, the user 102 is able to identify what type of message portions are contained in the message.

The multimedia message 700 preferably includes a key of action-to-index correspondence 716. The key 716 identifies to the user 102 what actions will be taken by the system 100a in response to the input of an index. Such actions include but are not limited to playing an audio stream, faxing a displayed page of a documents, faxing an entire document, faxing an image at normal size and faxing an image zoomed to fill a single page.

The multimedia message 700 also advantageously displays links 720 between message objects 706a, 706b, 708, 710, 712 and 714. These links 720 convey to the user 102 the relationship of documents 708, images 710, 714 and video clips 712 to the audio portions of the message 706a, 706b.

The most important part of the multimedia message 700 for enabling remote access is the indices 730 corresponding to each message portion 706a, 706b, 708, 710, 712 and 714. Each message portion 706a, 706b, 708, 710, 712 and 714 that is remotely retrievable is provided a set of indices 730 that are adapted for the types of delivery suited to the type of message portion 706*a*, 706*b*, 708, 710, 712 and 714. The present invention advantageously generates unique indices 730 and positions them near the upper left corner of the thumbnail image of the message portion 706*a*, 706*b*, 708, 710, 712 and 714. The unique indices 730 preferably have two components. A first component 732 indicates the type of action that will be taken by the system 100*a* if the user 102 inputs the index as part of the process of retrieving a message portion 706*a*, 706*b*, 708, 710, 712 and 714. The second component 734 is a number that uniquely identifies upon which message portion the action will be taken. This is just one embodiment for generating the indices and those skilled in the art will recognize that a variety of other indices may be used. For the exemplary message 700 of FIG. 7, there are five possible actions, and six message portions. As can be seen for the audio messages portions 706*a*, 706*b*, there is only one way to output them and each is uniquely identified, thus each only has one index. However, for the images, document and messages, each has two delivery options, thus each portion 708, 710, 712 and 714 is provided with two indices based on whether it is an image or a document.

Overview

While the methods of the present invention will now be described with reference to methods in which the user is prompted to provide input, it should be noted that the preferred methods of the present invention are preferably event-based methods, where the user is able to input control signals at any time and the system will execute processes and methods in response to input of such control signals. Therefore, in various alternate embodiments of the present invention different levels of prompting may be used, and those skilled in the art will understand how the methods detailed with reference to FIGS. 8–16 could be adapted to provide such different levels of linear prompting.

Figure 8:
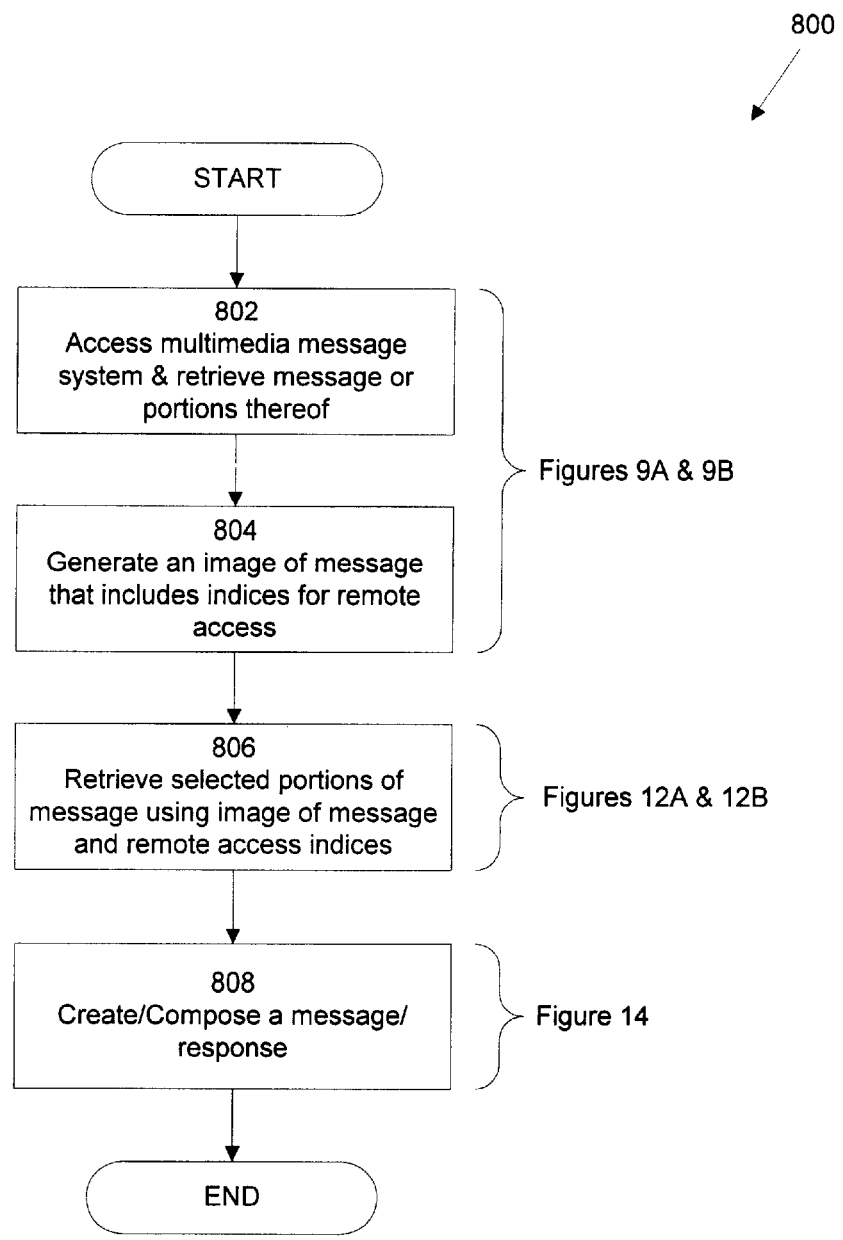
FIG. 8 is a flow diagram of a top-level process for retrieving and responding to a multimedia message in accordance with the present invention.

Referring now to FIG. 8, there is shown a flow diagram of a top-level control process for interacting with the multimedia message system 100*a* of the present invention. This flowchart shows a typical way that a user 102 would interact from a remote location with the multimedia message system 100*a*. Processing begins in step 802 with the user 102 accessing the multimedia message system 100*a* and retrieving a message or the audio portions of it. Then the system 100*a* generates in step 804 an image of the message 700 that includes the indices 730 as described in FIG. 7. This process is more fully detailed below in FIGS. 9A and 9B. Once the user 102 has the image of the message 700, the user 102 is able to retrieve 806 any portions of the message 700 desired using the indices 730. Once the user 102 has received the portions of the message 700 desired, the user 102 can remotely create 808 a response message that may include an audio portion and other portions, and send it to another user or add it to a message.

Retrieving an Image of a Multimedia Message

Figure 9A:
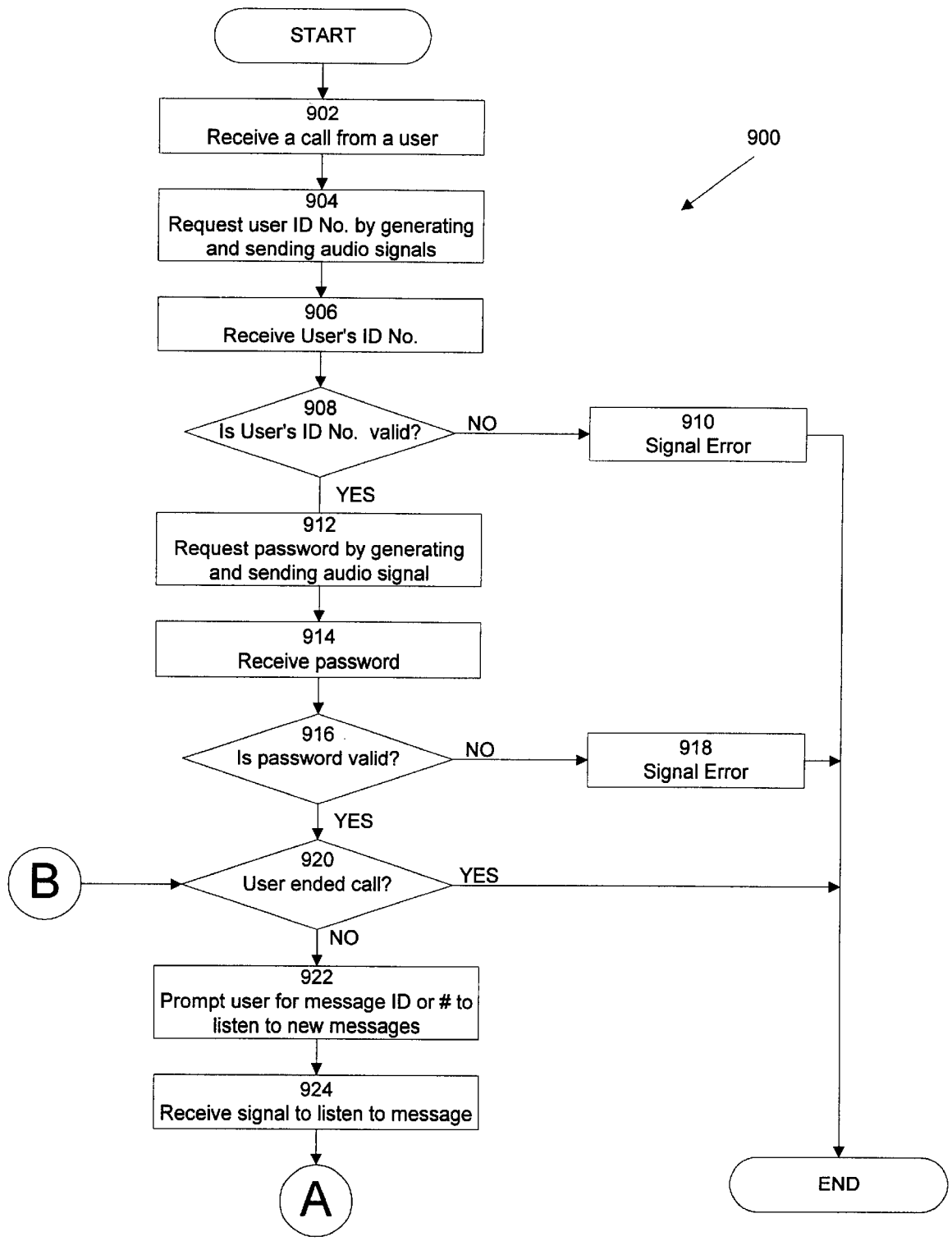
FIGS. 9A and 9B are a flow diagram of a preferred method for retrieving an image of a multimedia message in accordance with the present invention.
Figure 9B:
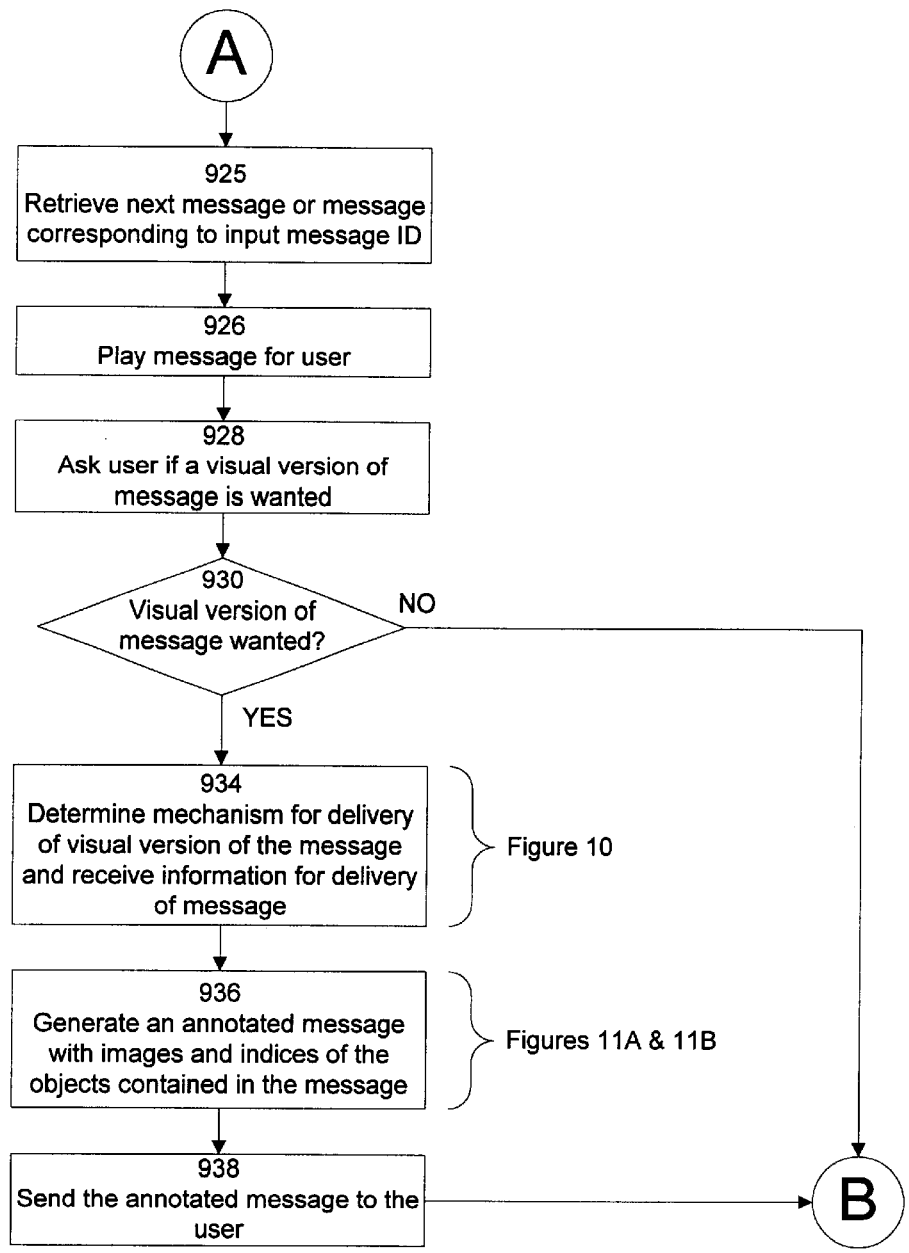

FIG. 9A and 9B show a flow diagram of a preferred method for retrieving an image of a multimedia message 700 in accordance with the present invention. The process begins in step 902 when the system 100*a* receives a telephone call from the user 102. The user 102 initiates the process by dialing a predefined telephone number provided to the user 102 by a system administrator, similar to off-site use of voice mail systems. The system 100*a* then requests 904 a user ID number by generating audio signals that are voice prompts and sending them to the user 102 over the telephone line. In an alternate embodiment, this could be done automatically using caller ID or automatic number identification, and the need for requesting a user ID could be eliminated. The methods of the present invention will now be described below as interacting with the user 102 and the user 102 providing input. Unless otherwise specified, the user 102 interfaces with the system 100*a* in a manner conventional to existing voice mail systems. The user 102 inputs his ID number using the keypad of the telephone. The system 100*a* receives 906 the user's ID number and determines 908 if the user's ID number is valid. This is done by a comparison of the number input to a database of valid numbers. If the number is not valid, the method signals 910 an error and ends. If the number is valid, the method continues to prompt 912 for a password. The user 102 inputs his password using the keypad of the telephone, and the password is received 914 by the system 100*a*. The system 100*a* then tests 916 if the password is valid. If the password is not valid, an error is signaled 918 and the process ends. Otherwise, the process continues to determine 920 if the user has ended the call by hanging up. At any time, the user 102 can terminate the process by ending the call. If the user 102 has ended the call, the process ends.

If the user 102 has not ended the call, the process continues to step 922. In step 922, the system 100*a* prompts the user 102 to listen to the next new message by entering the # sign on the telephone 104 or to listen to a specific message by inputting the message ID number using the keypad of the telephone 104. The user 102 inputs signals using the keypad of the telephone 104, and the signals are received 924 by the system 100*a*. Then in step 925, the system 100*a* retrieves either the next new message if the user input the # sign or the specific message indexed if the user input a message ID number. Then the system 100*a* plays a first audio portion of the message for the user 102. The system 100*a* preferably designates one audio portion in each message as a default to be played to the user 102 in step 926. Once the message has be been played for the user 102, the system 100*a* prompts 928 the user 102 as to whether he would like a visual version of the message to be sent by the system 100*a*. For example, the user 102 can be prompted to enter a particular numerical combination if a visual version of the message is to be sent by the system 100*a*. Alternatively, a predetermined input such as the "*" key could be input at any time the message was being played 926 as a default input for requesting a visual copy of the message. In the alternate case, the message would be sent to a default location by a default means, these defaults being pre-stored in a user profile. Then the system 100*a* determines 930 whether the user 102 wants a visual version of the message to be delivered. If the user 102 does not want a visual version of the message to be delivered, the method returns to step 920 to determine if the call has been ended.

If the system 100*a* determines in step 930 that the user 102 wants a visual version of the message, the method proceeds to step 934. In step 934, the system 100*a* determines the mechanism for delivering the visual version of the message, and receives information from the user for delivery of the message. How the message is delivered is dependent on the type of visual output device 106 that the user 102 has access to. This step of determining the delivery mechanism is described in detail below with reference to FIG. 10. After the delivery means has been determined, the system 100*a* generates 936 an annotated image of the message. The annotated image preferably includes indices of the objects contained in the message 700 as has been described above with reference to FIG. 7. This process is more fully detailed below with reference to FIGS. 11A and 11B. Once the annotated message has been generated 936, the process completes by sending 938 the annotated message to the user 102. Depending on the delivery mechanism, this may be by faxing, sending an image, or printing. After the visual image of the message has been sent, the process returns to step 920 to determine if the call has been ended.

Those skilled in the art will recognize that there are a number of different ways to retrieve visual representations of new messages in addition to that just described with reference to FIGS. 9A and 9B. One way is for a user 102 to call the system 100a and specify a fax number. (Alternatively, the user need only call into the system 100a; and the system 100a can identify the user using caller ID or automatic number identification, retrieve the user's profile from the database 312 for a default location and for the format for delivering visual objects.) The system 100a in response identifies the user's messages, and generates an overview cover sheet that has a thumbnail representation for each message (including visual representations for plain "voice" messages). This overview cover sheet functions just like all other pages—the thumbnails have indices allowing them to be retrieved or referenced via phone. Also, depending on the user's preferences, the overview cover sheet might be followed by one page for each full multimedia message (e.g., not just a voice message). Moreover, the user 102 can reply to the messages on the overview cover sheet by entering a reply command and the index for the message. In yet another embodiment, the generation of the overview cover sheet can be done automatically in response to the user 102 calling into the system 100a, the user 102 receiving a message, or any other event. In that case, the overview cover sheet is generated in response to the triggering event and sent to the user 102 via default delivery mechanism to a default location.

Determining the Delivery Mechanism

Figure 10:
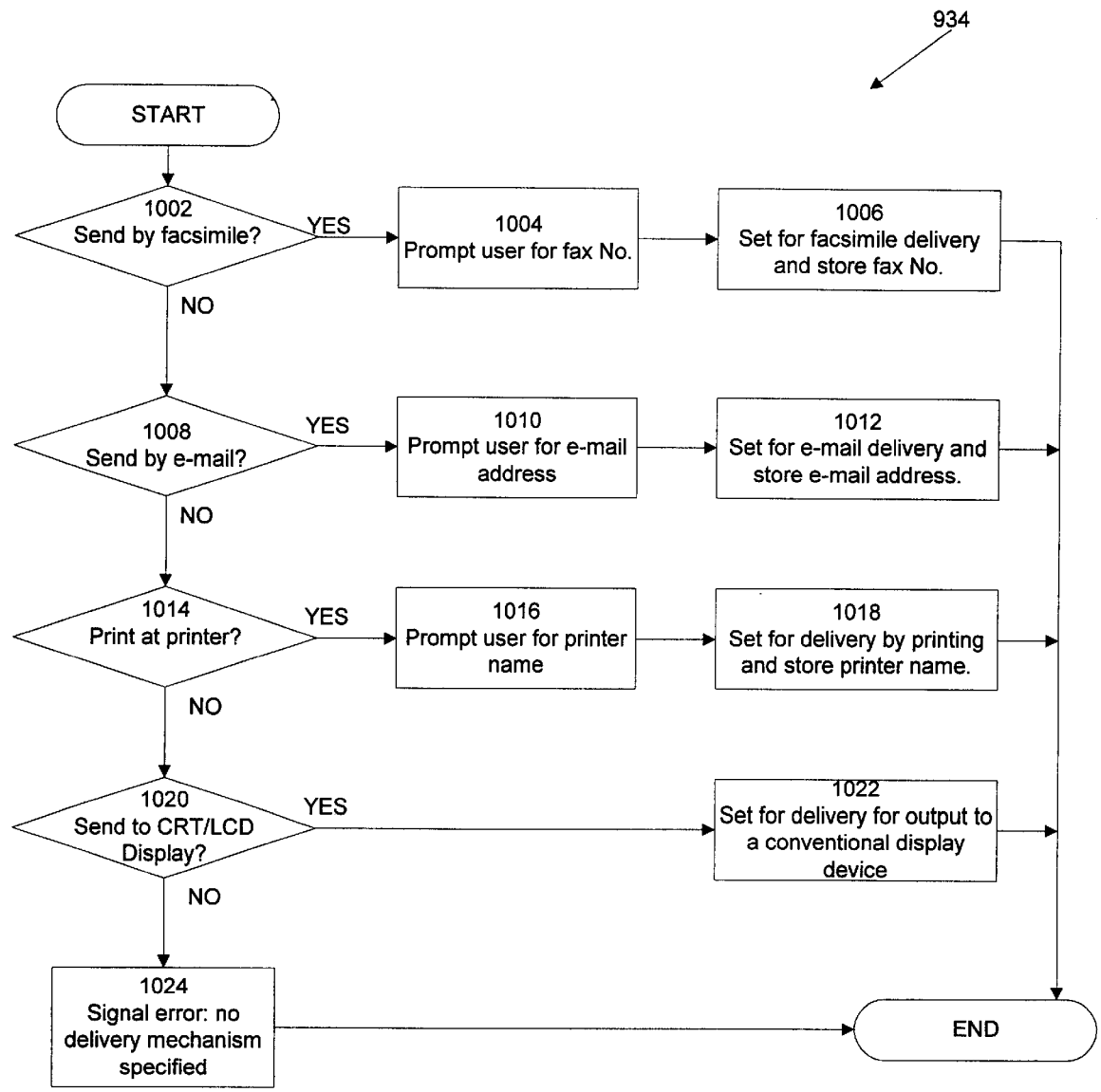
FIG. 10 is a flow diagram of a preferred method for determining a delivery mechanism for the image of the message.

FIG. 10 is a flow diagram of a preferred method for determining the delivery mechanism for the annotated image of the message. The method for determining the delivery mechanism begins by determining 1002 whether the visual output device 106 is a facsimile machine. This is preferably accomplished by prompting the user 102 to indicate if the visual output device 106 is a facsimile machine. If the user 102 responds that the visual output device 106 is a facsimile machine, the method continues and prompts 1004 the user 102 to input the telephone number for the facsimile machine. Then the method receives the input from the user 102 and sets 1006 the delivery mechanism to be via facsimile transmission to the number received from the user 102. The method also stores the facsimile number for future use, after which the method ends.

If the delivery mechanism is determined not to be by facsimile, then the method tests 1008 whether delivery mechanism is by sending e-mail. This is again accomplished by prompting the user 102 to indicate if the visual output device 106 is a computer. If the user 102 responds that the visual output device 106 is a computer, the method continues and prompts 1010 the user 102 to input the e-mail address where the messages or message portion should be sent. Then the method receives the input from the user 102 and sets 1012 the delivery mechanism to be by e-mail to the address received from the user 102. Alternatively, the method could automatically retrieve an e-mail address from a profile for the user, thus obviating the need for the user to repeatedly provide his/her e-mail address. The method may also store the email address for future use, after which the method ends.

If the delivery mechanism is determined not to be by e-mail, then the method tests 1014 whether delivery mechanism is by printing to an identified printer. If the delivery mechanism is by printing, the method continues to prompt 1016 the user 102 for a printer name or some other input to identify the address of the printer. In one embodiment, the system could prompt the user 102 with various printer names and request that the user input particular keys on the keypad of the audio communication device 104 when the name of the desired printer is given. Once the user 102 has responded with input, the method receives the input, sets 1018 the delivery mechanism to be by postscript file to a specific printer, and stores the printer name for future use.

If the delivery mechanism is determined not to be by printer, then the method tests 1020 whether delivery mechanism is sending to a display device. If the user confirms that the delivery mechanism is sending to a display device, the method proceeds to set 1022 the delivery for output to a conventional display device such as a CRT or LCD panel, after which the method is complete. If the delivery mechanism is not sending to a display device, the system 100a signals 1024 an error because the user 102 has failed to indicate the method for sending the visual images to the user.

Generating an Image of a Message

Figure 11A:
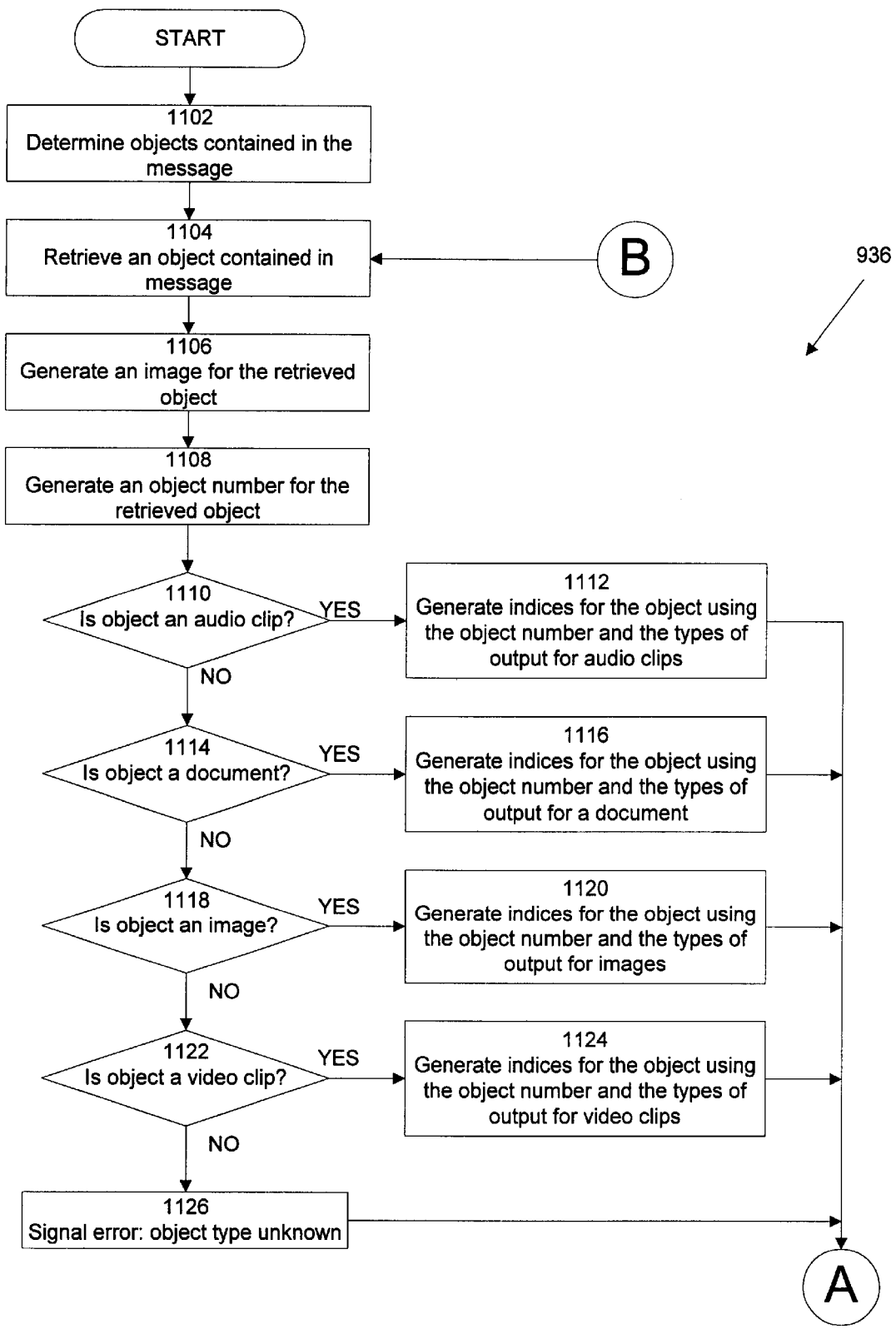
FIGS. 11A and 11B are a flow diagram of a preferred method for producing or generating a remotely usable image of a multimedia message in accordance with the present invention.
Figure 11B:
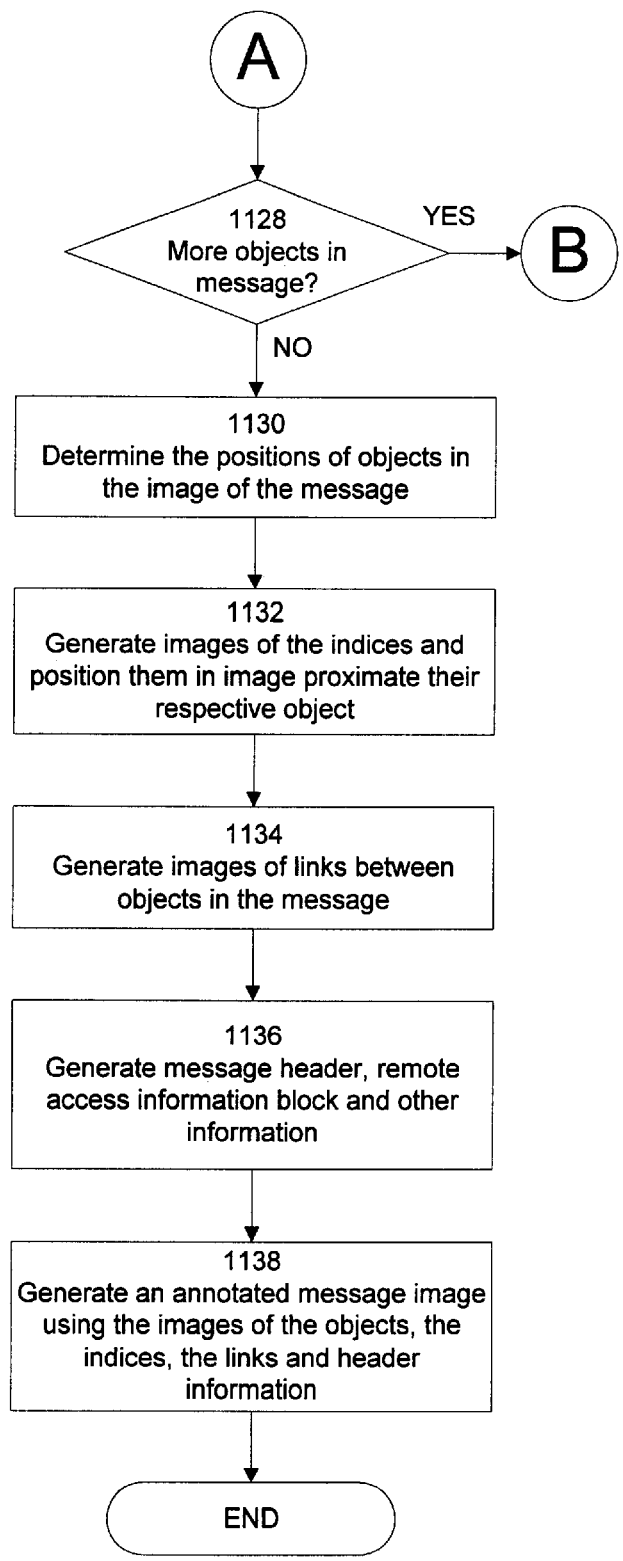

Referring now to FIGS. 11A and 11B, a preferred method for generating a remotely usable image of a multimedia message is shown. The method begins with the identification of a multimedia message by the user. Then the system 100a determines 1102 the objects or message portions that are contained in the multimedia message. A first one of the objects determined to be part of the message is then retrieved 1104, and an image of the retrieved object is generated 1106. As noted above, the image will depend on the type of object, and is preferably a thumbnail image of some portion of the object's content. Audio portions will have one format, images and documents will have a second format, and video clips with have yet a third different format. Once the image is created, a reference or object number will be assigned 1108 to the image and the object. The reference numbers are preferably assigned and stored for later retrieval as each image is created (e.g., by using a counter to keep track).

The method next determines 1110 whether the retrieved object is an audio clip. If the retrieved object is an audio clip, the method generates 1112 an index for the object based on the object number (step 1108) and a number associated with the action of playing an audio message. For example, the present invention provides the number "1" as indicating an action of playing a message. Thus, for an audio messages, a single index is created that is a combination of 1 and the object number. After generation of the indices, the method continues in step 1128. While the present invention contemplates only a single action for audio messages, alternate embodiments could specify any number of other actions to be performed with the audio portion or object.

If the retrieved object is not an audio clip, the method next tests 1114 whether the retrieved object is a document. If the retrieved object is determined to be a document, the method generates 1116 indices for the object using object number generated in step 1108 and the output options for documents. In the preferred embodiment, the method has two output options for documents: 1) to send the entire document to the visual output device 106, or 2) to send only the first page of the document to the visual output device 106. Thus, for each document object, a pair of indices will be created. In an exemplary embodiment, the number "2" is input if the user 102 wants only the first pages sent, and the number "3" is input if the user 102 wants the entire document sent. Therefore, the first index for a document is 2 and the object number concatenated, and the second index for the same document is 3 and the object number concatenated. The indices are generated 1116 for the object after which the method continues in step 1128. Those skilled in the art will recognize that there could be a variety of other output options for documents in alternate embodiments such as sending the first and last pages of the document.

If the retrieved object is not a document, the method next determines 1118 whether the retrieved object is an image. If the retrieved object is determined to be an image, the method generates indices for the object using object number generated in step 1108 and then outputs the options for images. In the preferred embodiment, the method provides two output options for images: 1) to send the image at normal size to the visual output device 106, or 2) to zoom the image to fit an output page of the visual output device 106 and send the zoomed image to the visual output device 106. Thus, for each image object, a pair of indices will be created. In an exemplary embodiment, the number "4" is input if the user 102 wants only the image at normal size sent, and the number "5" is input if the user 102 wants a zoomed image sent. Therefore, the two indices for images are 4 in combination with the object number, and 5 in combination with the object number. The indices are generated 1120 for the object after which the method continues in step 1128. Again, those skilled in the art will understand that there could be a variety of other output options for images in alternate embodiments.

If the retrieved object is not an image, the method next determines 1122 whether the retrieved object is a video clip. If the retrieved object is determined to be a video clip, the method generates 1124 indices for the object using object number generated in step 1108 and the output options for video clips. This step could be the same as step 1120 if only the two output options are provided. However, if a different output option such as displaying selected frames of the video clip is provided, then step 1124 generates the corresponding indices. After step 1124, the method continues to step 1128.

If the retrieved object is not a video clip 1122, the method proceeds to step 1126. In one embodiment, an error is indicated to the user 102 to indicate that only some of the message portions will be retrievable before proceeding to step 1128. Alternatively, there may be some portions or objects in a message that are not provided with an index, are not retrievable, and thus, only are shown as thumbnails in the message 700. While not shown in FIG. 11A, the present invention could be modified to test for and create indices for any other types of objects. For example, if web pages are provided as a type of object, this method could include the steps of testing for whether an object is a web page and generating indices based on the method for outputting web pages. Those skilled in the art will recognize how this may be extended for any other object types.

Those skilled in the art will recognize that steps 1112, 1116, 1120, and 1124 provide only one scheme for generating indices based primarily on each index having portions specifying the function and a document number. There are a variety of other index generation methods that could also be used in the present invention. For example, the index generation could be based primarily on user ID and document type. Such a scheme would have portions of the index formed by user ID, object type and a number of images from the author (e.g. #20301 might indicate author No. 2, image data type, and 1 image added by this author). Such a transparent numbering or indexing scheme allows users to remember and enter indices. This even allows access to the message without need for a visual image of the message. For example, a user could just input indices based on known user ID and type of messages desired. The system 100*a* would either return the messages or indicate that messages with the index input did not exist thereby allowing the user 102 to determine the state of the conversation remotely.

After either step 1112, 1116, 1120, 1124 or 1126, the method arrives at step 1128. In step 1128, the method determines whether there are additional objects contained in the message for which indices have not been generated. If there are additional objects, then the method returns to step 1104 to retrieve a next object and generate indices for that object. If there are not additional objects, then the method proceeds to determine 1130 the position of the objects in the message relative to each other. This is done in the same manner that the multimedia message system 110 generates an image for a display device directly connected to the multimedia message system 110. Then images of the indices 730 are generated 1132 and they are positioned proximate their respective object. The indices 730 are preferably positioned near the upper left corner of the thumbnail for the object. Next, the images of the links 720 are generated 1134. In step 1136, the method retrieves message header 702 and generates an image of it. The method also produces an image of the information 704 for remote access including instruction, fax/phone numbers, user ID numbers, Message ID numbers, reply instructions, etc. This information is preferably in a machine-readable format. The method then adds other information, such as a bar code or a URL to be used in a cover sheet when faxing new documents back into (and adding them to) the message. Depending on preferences, the documents referenced in a message might also be automatically faxed (or one page from each), and thus, such additional documents would also be retrieved and generated in this step. Once all of the constituent components of the message 700 have been generated, they are combined 1138 into an annotated image and the annotated message 700 is delivered (step 938 of FIG. 9B) to the visual output device 106.

Remotely Retrieving Multimedia Messages

Figure 12A:
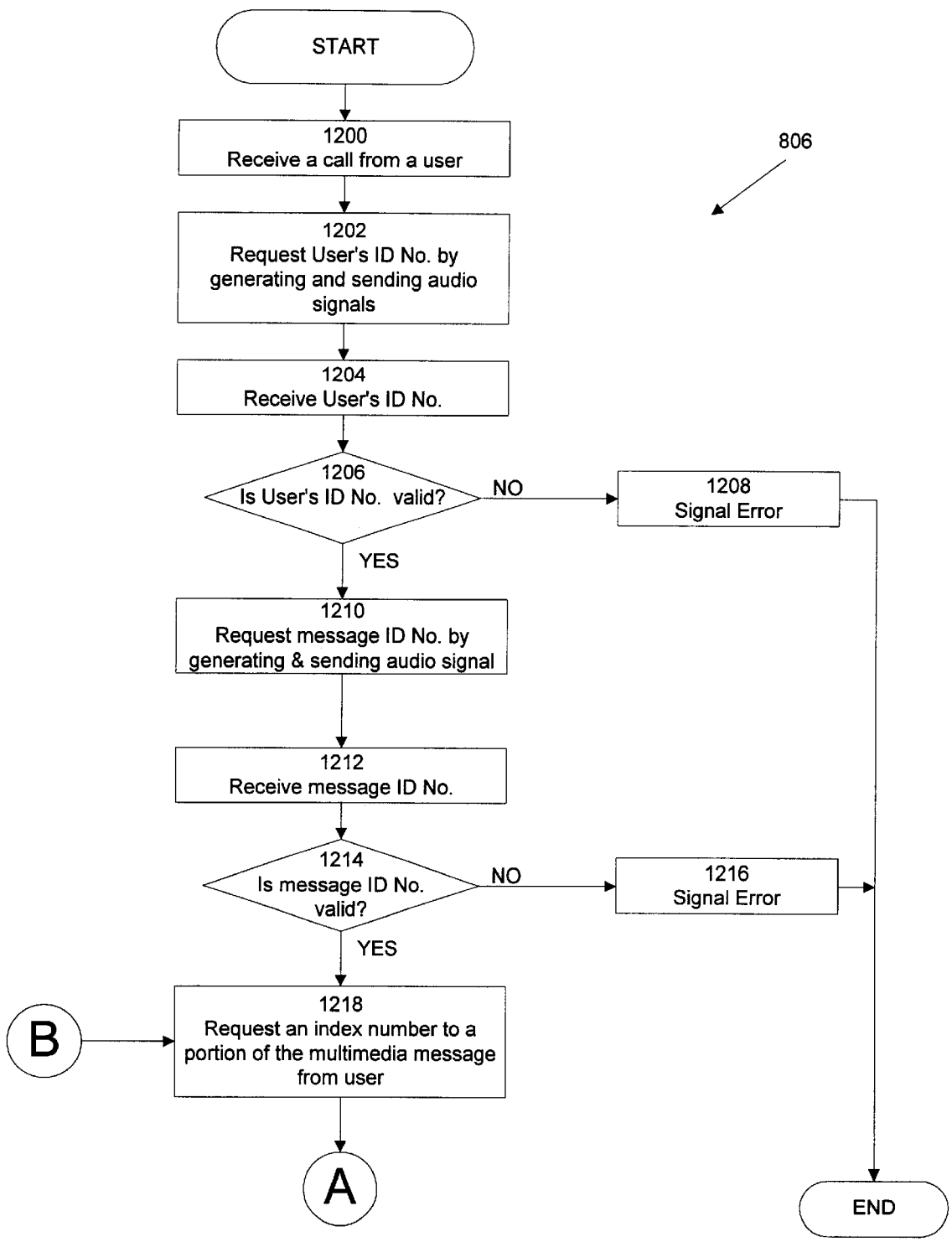
FIGS. 12A and 12B are a flow diagram of a preferred method for retrieving visual or audio portions of a multimedia message in accordance with the present invention.
Figure 12B:
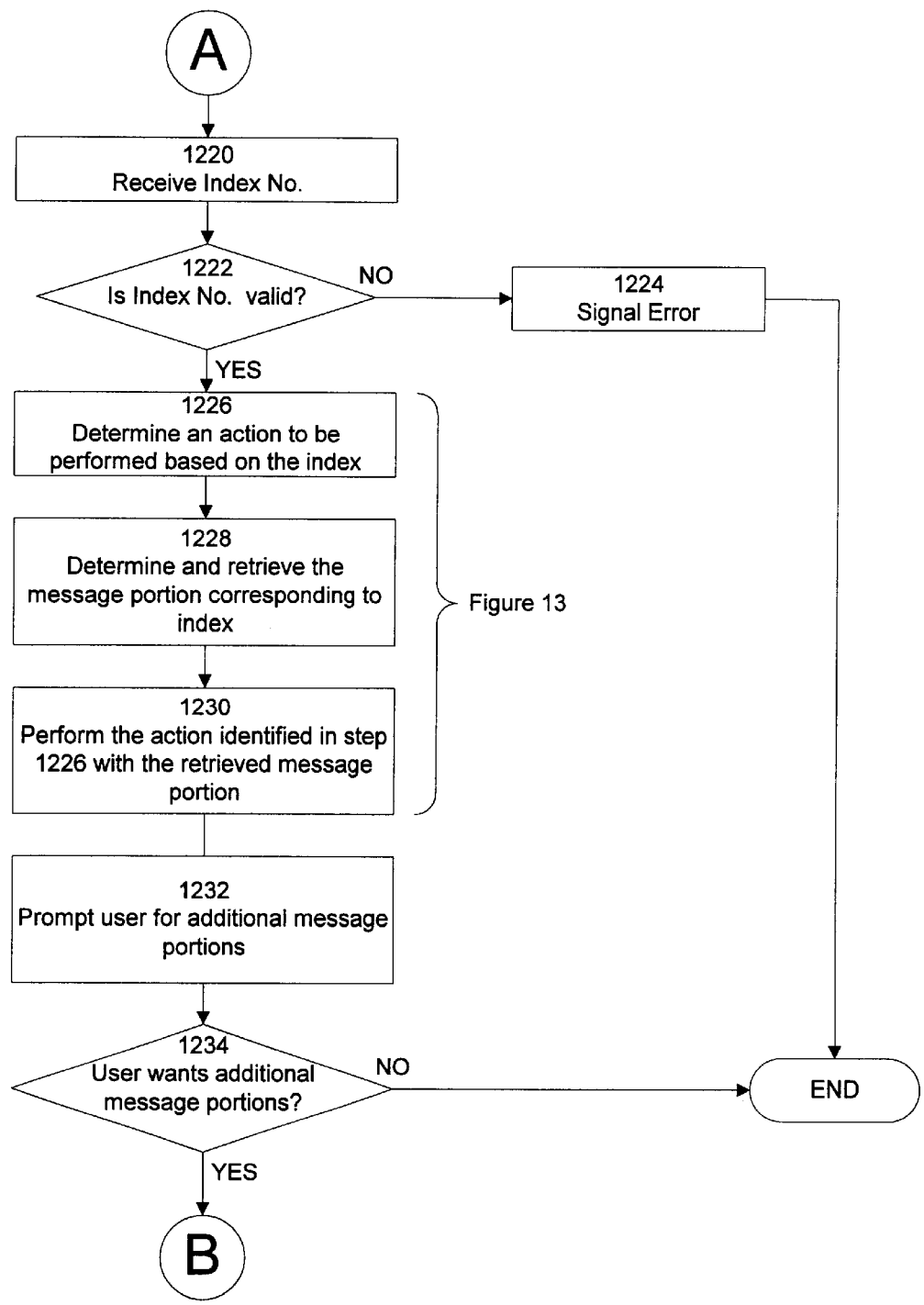

FIGS. 12A and 12B show the preferred method for retrieving visual or audio portions of a multimedia message in accordance with the present invention. The process begins by requesting a user ID number 1202, receiving a user's ID number 1204, and verifying 1206 it in the same fashion to that described above in FIG. 9A. In performing the method of FIGS. 12A and 12B, it is assumed that the user 102 has obtained an image of the message 700, and thus knows the various objects or portions that form the message 700 as well as their indices. The method requests 1210 a message identification number for the message that the user 102 is accessing and retrieving. The user 102 inputs the message ID number using the keypad of the telephone, and the message ID number is received 1212 by the system 100*a*. The method then determines 1214 if the message ID number is valid by comparing it to a list of valid message ID numbers. If the message ID number is not valid, the method signals 1216 an error and then ends. If the message ID number is valid, the method prompts 1218 the user 102 to input an index number corresponding to the portion of the multimedia message that the user 102 wants to retrieve. The user 102 inputs the index number using the keypad of the telephone, and the index number is received 1220 by the system 100*a*. The system 100*a* verifies 1222 that the index number is a valid one and continues in step 1226. If the index number is not valid, the system 100*a* signals 1224 such to the user and the retrieval process ends.

In step 1226, the method determines the action to be taken (the type of delivery for the message portion). The method next determines 1228 the message portion corresponding to the index by retrieving an object based on the message identification number and the object number that is part of the index. Then the system 100a performs 1230 the action identified in step 1226 with the retrieved message portion. These steps 1226, 1228, and 1230, are described below in more detail for the exemplary system. Since at least one message portion has been retrieved after step 1230, the method continues by prompting 1232 the user 102 for additional message portions to be retrieved. The system 100a determines 1234 whether the user 102 wants to retrieve additional message portions. If so, the method returns to step 1218 to request the index number for the message portion from the user 102. If not, the retrieval process is complete and ends.

Figure 13:
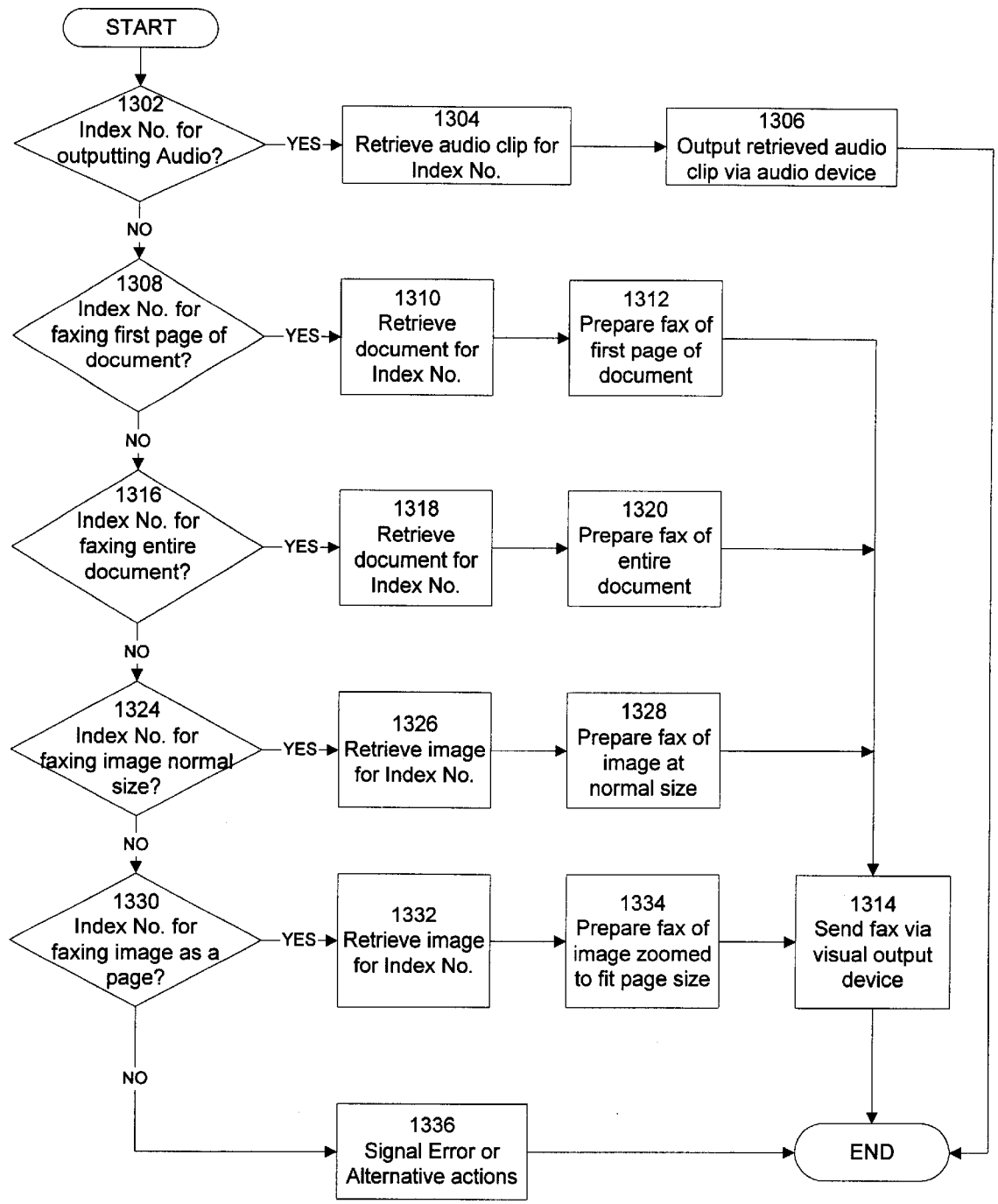
FIG. 13 is a flow diagram of an exemplary method for using indices and delivering content of a multimedia message in specific ways for one embodiment of the present invention.

Referring now also to FIG. 13, an exemplary method for using indices and delivering content of a multimedia message is shown. This exemplary method corresponds to the case where the system 400c is configured as shown in FIG. 4C and portions of a message as shown in FIG. 7 are delivered to the facsimile machine 406 or the telephone 104. The method first tests 1302 whether the index number corresponds to an action for an audio stream. If so, the audio clip corresponding to the object identified in the index is retrieved 1304 and then it is output 1306 over the audio interface 302 and telephone 104 to the user 102.

If the index number does not correspond to sending an audio stream, the method next determines 1308 whether the index number corresponds to the action of faxing the first page of a document. If the index number does correspond to faxing the first page of a document, the document corresponding to the object identified in the index number is retrieved 1310, the first page of the document is prepared 1312 into a facsimile transmission, and the facsimile transmission is output 1314 over the visual output interface 314 to the facsimile machine 406.

If the index number does not correspond to faxing the first page of a document, the method next determines 1316 whether the index number corresponds to the action of faxing the entire document. If the index number does correspond to faxing the entire document, the document corresponding to the object identified in the index number is retrieved 1318, the entire document is prepared into a facsimile transmission 1320, and the facsimile transmission is output 1314 over the visual output interface 314 to the facsimile machine 406. It should be understood that alternatively, where a user is requesting a number of the messages to be sent by facsimile (either the first pages or the entire documents) then the request for multiple messages could be combined into a single facsimile as a response to the multiple requests.

If the index number does not correspond to sending the entire document, the method next tests 1324 whether the index number corresponds to the action of sending an image at normal size. If the index number is for sending an image at normal size, the image corresponding to the object identified in the index number is retrieved 1326, the image at its normal size is prepared into a facsimile transmission 1328, and the facsimile transmission is output 1314 over the visual output interface 314 to the facsimile machine 406.

If the index number does not correspond to sending an image at normal size, the method next tests 1330 whether the index number corresponds to the action of sending an image zoomed (increased or decreased) in size to fill the page. If the index number is for sending an image zoomed in size to fill the page, the image corresponding to the object identified in the index number is retrieved 1332. The image is zoomed to match the standard size for a facsimile transmission, and the zoomed image is prepared as a facsimile transmission 1334. The facsimile transmission is then output 1314 over the visual output interface 314 to the facsimile machine 406.

Finally, if the index number does not correspond to sending an image zoomed in size to fill the page, the method signals 1336 an error because the user has input an index that does not correspond to an action. Alternatively, in step 1336 other ways of sending a message portion could be offered to the user 102.

Remote Message Composition and Reply

Figure 14:
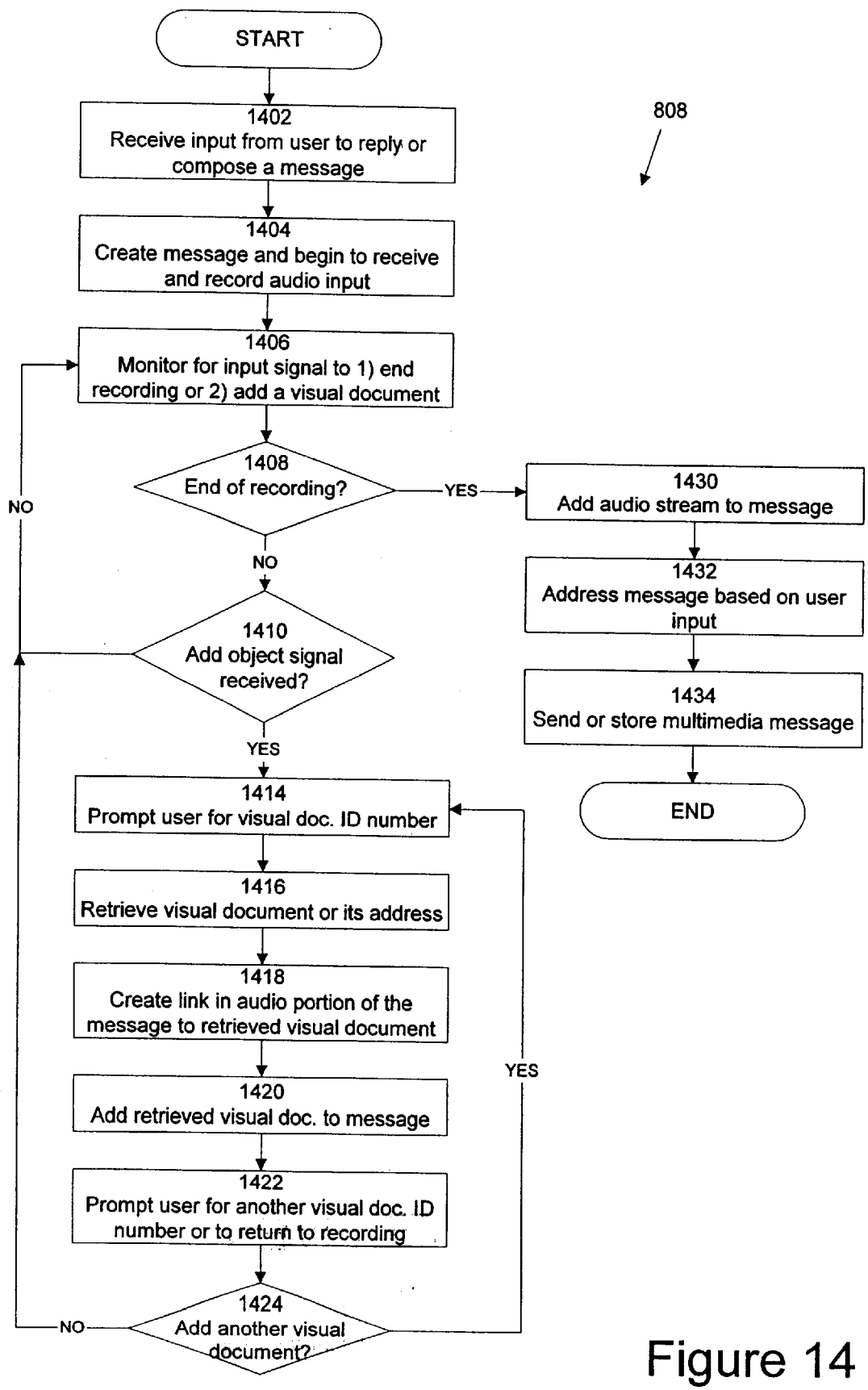
FIG. 14 is a flow diagram of a preferred method for remotely composing and replying to a multimedia message according to the present invention.

Referring now to FIG. 14, a preferred method for remotely composing and replying to a multimedia message will be described. Before starting the method, it is assumed that the user 102 has remotely accessed the multimedia message system 110. The user 102 may also add or append objects to an existing message. In such a case, the user 102 would be prompted to identify the messages and other verification procedures would also be performed as has been described above for retrieving messages. The user 102 may also without prompting just indicate a document for attachment using the keypad of the telephone while talking. The user 102 at some point signals that he wants to create a message or reply and the input is received in step 1402. A message is created 1404, and the system 100a begins to receive audio signals from the user 102 that will ultimately form an audio stream. As the user 102 is providing audio input and it is being recorded, the system 100a monitors 1406 for a signal from the user 102 that the recording is complete or that an object should be added to the message. For example, while recording a message, the user 102 may simply touch the keypad to enter numbers corresponding to objects or documents to be attached. The system 100a tests 1408 whether user 102 has indicated the end of recording such as by hitting the # key. If the user 102 has ended the recording, the method adds 1430 the audio stream just recorded to the message, addresses 1432 the message based on input from the user 102, and sends 1434 the message.

While the method for addressing 1432 and sending 1434 a message just described the process as manual one, the present invention preferably maintains various user profiles and provides for the automatic delivery and receipt of reply messages. The multimedia messaging system 110 is preferably enhanced to provide the automatic delivery of messages/conversations appropriate to the receiver's profile. Each user 102 preferably has a profile defining the preferred method for delivery of the reply stored in database 312. For example, a default user profile would be set to respond in a similar manner to how the message was received. In that case, replies to voice messages would get delivered by the multimedia messaging system 110 to the phone of the original calling party (the number identified by caller ID or voice recognition on original message or input by user) while replies to multimedia messages are sent by email or the World Wide Web. It is assumed that the original sender has used the mechanism for communication that he is most comfortable with and in which he would like the reply. Alternatively, if the user 102 is known to the multimedia messaging system 110, his user profile can be retrieved, and the reply message can be sent according to the preferences set by the user 102 as the preferred method of message notification. This is particularly advantageous because the user 102 may change his profile as desired. Thus, when he is in the office and has full access to an interactive computer, display, etc., he can have messages returned as multimedia messages, and when he is out of the office traveling the preferences can be set for response in voice message format.

Furthermore, the multimedia messaging system 110 is additionally automated by automatic generation of user IDs for a user that is external to the system 110. The voice message sent to such an external user also appends an audio message with information specifying how to access the system, his user ID, a password, etc. Thereby, an external user can use the methods described throughout this application to access multimedia messages just as any remote user can.

If the user 102 has not ended the recording, the method determines 1410 whether the user 102 wants to add an object to the message. If the user does not want to add an object to the message, the method returns to step 1406 to continue monitoring for control input from the user 102. If the user 102 has indicated that an object is to be attached, the method prompts 1414 the user 102 to indicate the object or document that is to be attached to the message.

Figure 15:
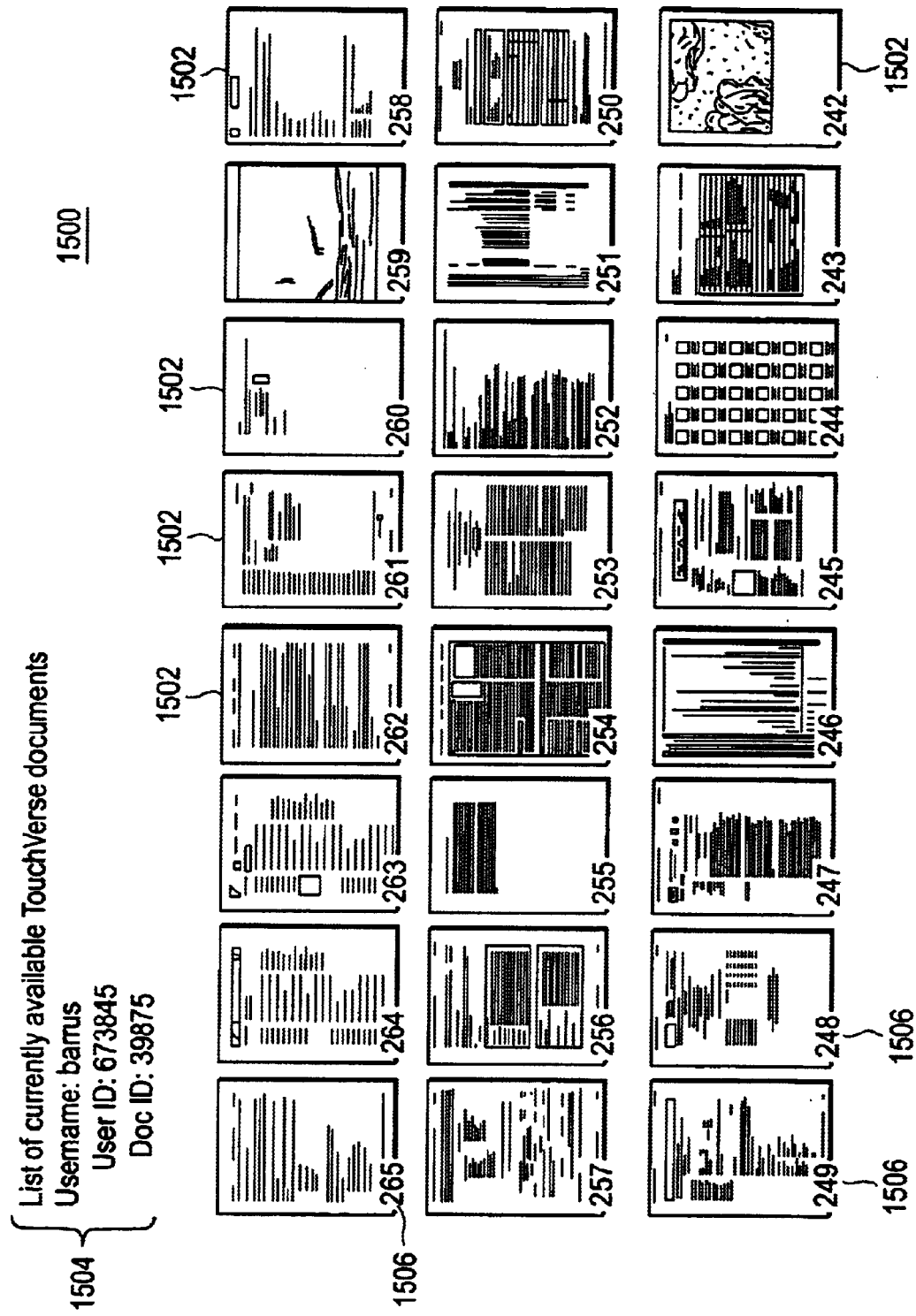
FIG. 15 illustrates a graphical representation of a deliverable image or list of documents for remote use in responding to a multimedia message.

Referring now also to FIG. 15, a graphical representation of a deliverable image or list 1500 of objects 1502 provided by the present invention is shown. The list 1500 of objects 1502 preferably includes a header 1504 to uniquely identify the list 1500, a thumbnail image of each object/document 1502, and a unique index 1506 for each document. Each of the objects 1502 in the list 1500 preferably has its own unique reference number or index 1506 that user 102 may input from a remote location to identify specifically the object that is to be attached. Images of list 1500 can also be provided to the user 102 in a manner similar to that used to provide the user 102 with an image of a message (see FIG. 11A and 11B above). There are other methods for inputting and selecting documents as will be described below with reference to FIGS. 16–18.

Figure 16:
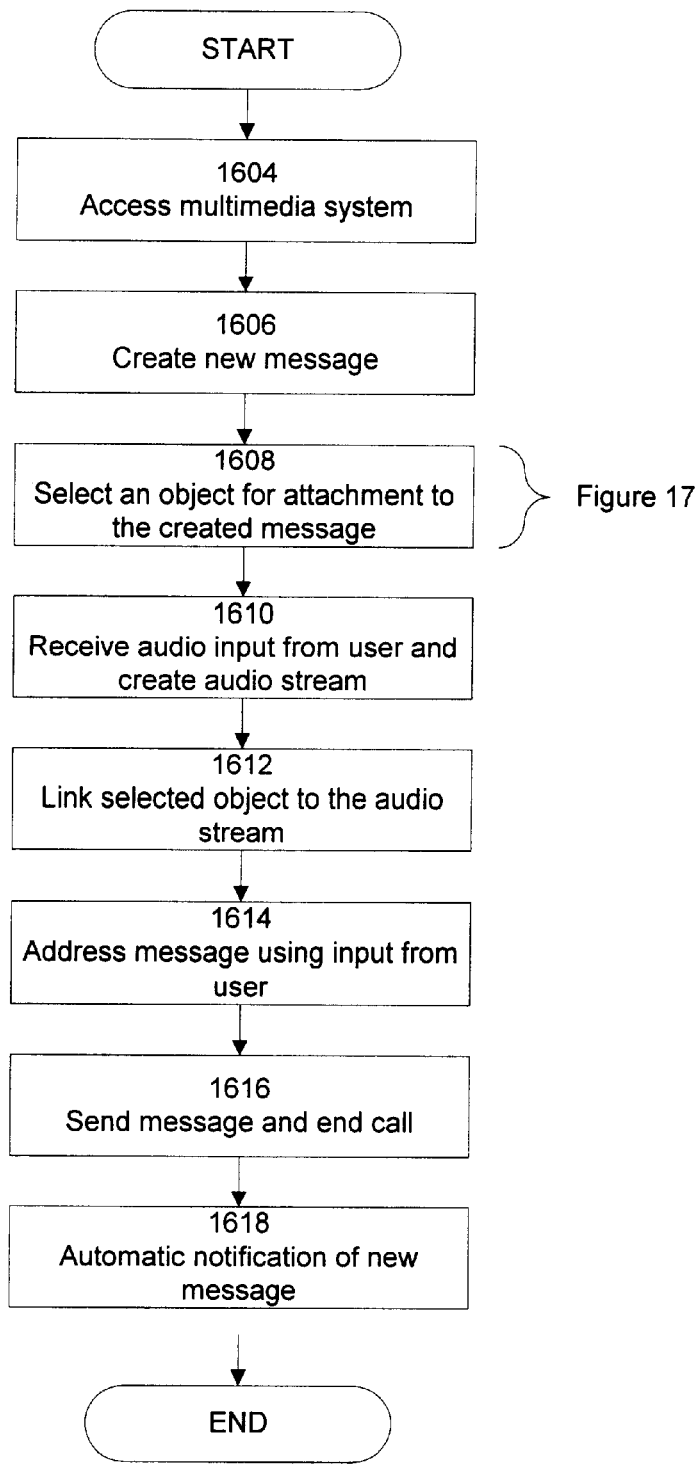
FIG. 16 is a flow diagram of a preferred method for remotely creating and sending a message including a visual object.

Referring now to FIG. 16, an alternate embodiment of a method for remotely creating and sending a message including a visual object is shown. The process will be described in terms of a document or object. These terms are used interchangeably to refer to any object such as an image, a photo, a video clip or any other visual input. The process starts using a telephone 104 to call the multimedia messaging system 110, and the user 102 accesses 1604 the system 100a. The user 102 interacts with the system 100a using either voice or key commands to create 1606 a new message. The user 102 selects 1608 an object for attachment to the message as will be described below with reference to FIG. 17. It should be understood that this step 1608 is optional. A user may add only an audio object, in which case the message contains only the audio stream or object. In the case where it is a reply, only the audio object is added to an existing message. In either case, the creation of the object includes the generation of an icon or image 706a for audio objects as has been described above with reference to FIG. 7. The system 110 then receives 1610 audio input from the user and creates an audio stream or object. The audio stream is added to the message and linked 1612 to the selected visual object. The user 102 must then address 1614 the message to another recipient in the system 100a. For example, the message could be addressed by multimedia messaging system 110 in response to the user 102 keying in or speaking a name and using voice recognition to determine the recipient. The system 100a next sends 1616 the message to the recipient. The reply or message composition process is further automated with a final optional step of automatically notifying 1618 the user about the added object. This notification could be done by any of a number of conventional mechanisms such as e-mailing, faxing, printing or otherwise generating an image of the cover sheet for the message with the added object. If the notification method is by return voice mail, paging, or calling, the delivery of the notification would not include the cover sheet but could be a voice or text message according to what the notification method permits.

Figure 17:
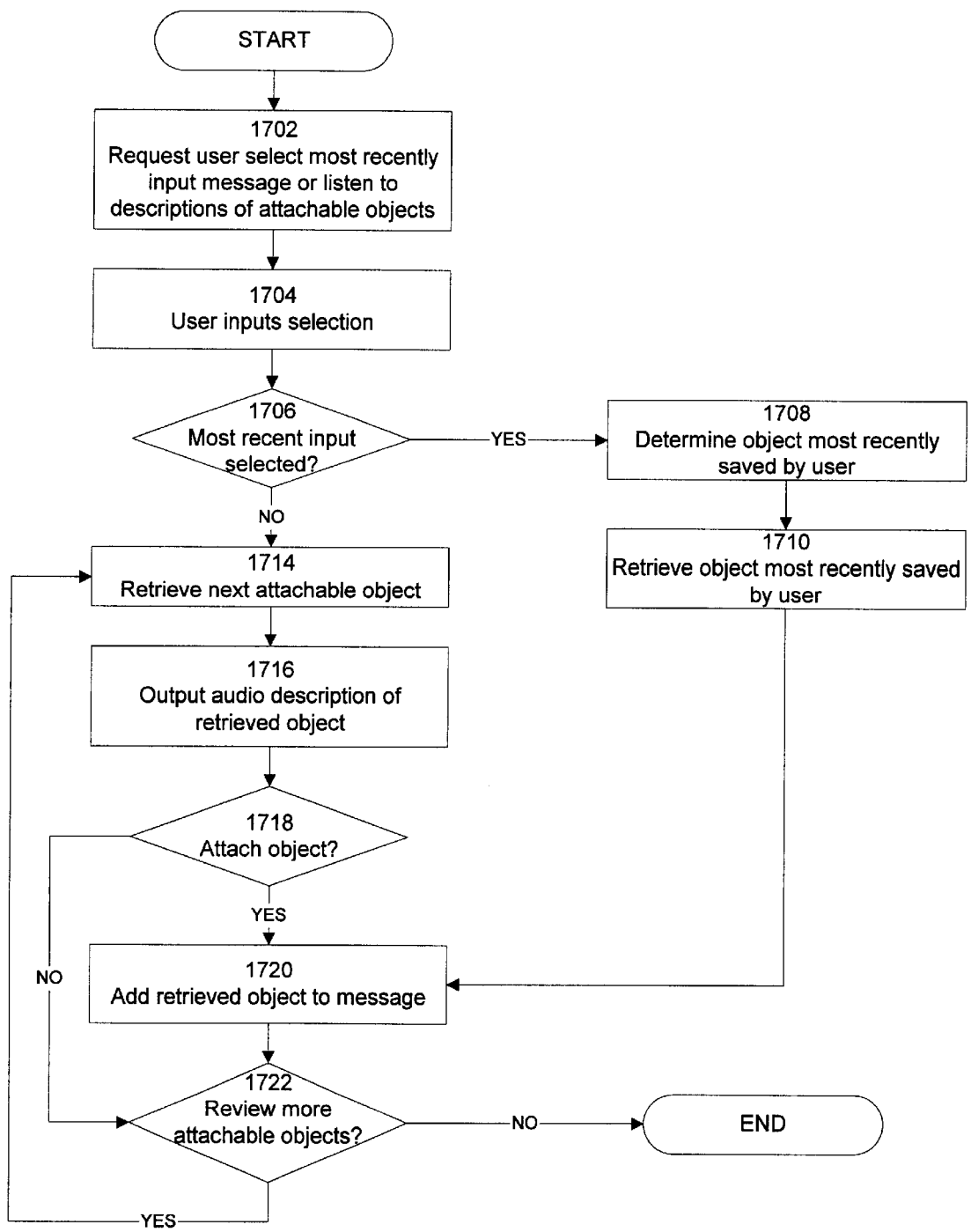
FIG. 17 is a flow diagram of a preferred method for selecting a visual object for attachment in a multimedia message.

FIG. 17 is a flow diagram of a preferred method for selecting a visual object for attachment in a multimedia message. This selection method starts with the system 110 requesting 1702 that the user 102 select either the most recently input message/object or listen to descriptions of attachable messages. This is done by prompting the user 102 to input one of two keypad combinations. The user 102 then inputs 1704 a selection that is received by the system 110. The method then determines 1706 whether the input was a selection of the most recently input document. If it was, the method determines 1708 the object most recently input and saved into the system 100a by the user 102 and retrieves the object 1710 before continuing to step 1720. If the input was not a selection of the most recently input document, the method retrieves 1714 a next attachable document from a list of attachable documents corresponding to the user 102. The system 110 preferably maintains a profile for each user 102 that includes a list of unattached objects and a list of attachable objects. A single not-yet-reviewed document from the list of unattached objects for the user 102 is retrieved in step 1714. Then the audio description, if any, associated with the object is retrieved and output 1716 to the user 102. The system 110 then determines 1718 if the user 102 input a signal to attach the retrieved document. If the method determines the user 102 does want to attach the retrieved document, this is done in step 1720. If the method determines the user 102 does not want to attach the retrieved document, this method continues to test 1722 whether there are more un-reviewed documents in the list. If there are more un-reviewed documents in the list, the method returns to step 1714 to retrieve the next document on the list. If not, the method is complete and ends.

While the methods for creating a new message or replying to an existing one are described above as a serial process, those skilled in the art will recognize that the steps of creating could be done incrementally, and thus before an input, such as a voice message, has been finished, the creation of the message and the object are done, and the data is added or streamed into them incrementally. This allows nearly simultaneous communication, with the recipient being able to listen to an audio object at nearly the same time as it is being added to the system 110 by the sender. Also, the system 100a has no restrictions on two different users updating or replying to the same message at the same time. Thus, multiple users may add objects to messages to create a type of synchronous dialog that parallels a conversation and use of visual aids.

Remote Audio and Video Object Input

A. Remote Audio Input.

Those skilled in the art will recognize that the multimedia-message system 110 can be integrated to include voice mail functionality as has been noted above. This functionality is also preferably augmented with additional capabilities for automatically indexing and adding voice mail messages to the multimedia message system 110 so that they may be remotely accessed using the present invention. For example, the multimedia message system 110 preferably automatically assigns voice mail messages received from other people to a conversation based on caller ID, or if using the multimedia message system 110 (a TouchVerse server) as the voice mail system, the server might prompt the caller for a message reference. Voice mail sent/delivered by the multimedia message system 110 (a TouchVerse server) preferably has a prefix and/or suffix attached that identifies the message, caller, and number to call back.

B. Remote Video Input.

Figure 18:
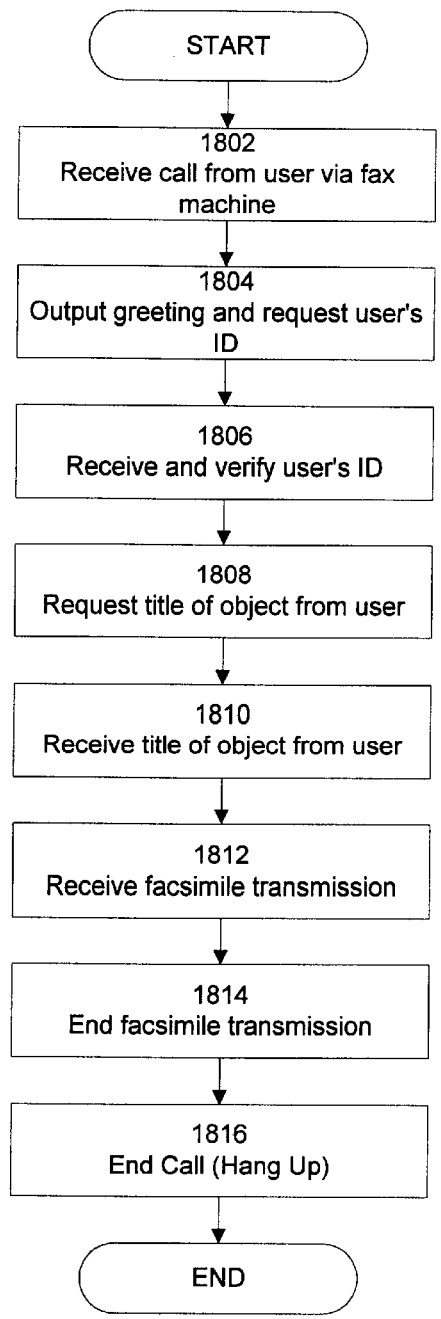
FIG. 18 is a flow diagram of a preferred method for remotely inputting a visual object into the multimedia messaging system.

In those embodiments that provide a visual input capability such as described above in FIGS. 4C–4E, the present invention also provides a method for inputting visual objects into the multimedia messaging system 110. FIG. 18 will now be described in the context of a system 400c such as shown in FIG. 4C, however, those skilled in the art will understand how the methods could be modified for the other embodiments that provide a greater ability to input control signals from the input/output communication device 112.

A key aspect of the present invention is providing the functionality of the multimedia system 110 remotely. Part of this functionality is the composition of new messages by adding documents or adding new documents to a message. For existing conversations, the method preferably adds new documents by faxing the new document to the multimedia messaging system 110 (server) using a printout of the message as a cover sheet for one or more other documents. The printout of the message is preferably annotated by the user 102 with handwriting to indicate where the new document(s) should be positioned within the existing message. For example, the user 102 may hand draw an "X" to mark the location of the new document in the existing message. The printout of the message could contain a bar code, a URL, or other machine readable information that can be used by the multimedia messaging system 110 to determine the message to which the document(s) being faxed should be added. The cover sheet and either one or more other documents are then faxed to the remote access system 108 using the fax machine 406.

Figure 19:
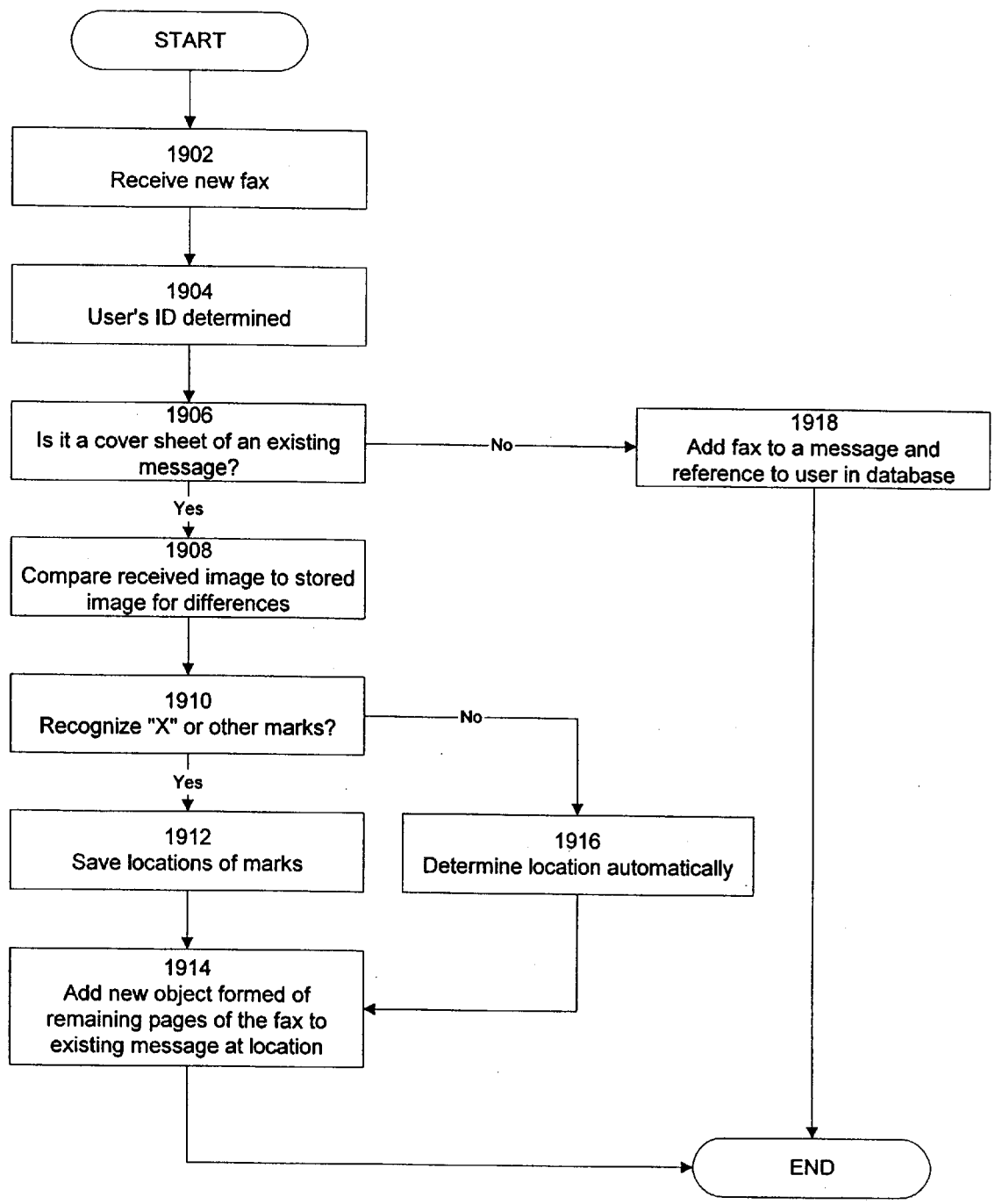
FIG. 19 is a flow diagram of a preferred method for processing and automatically positioning an input object in a message.

Referring now to FIG. 19, a preferred method for processing and automatically positioning an input object in a message will be described. The method begins by receiving a new facsimile transmission in step 1902. The facsimile transmission preferably comprises one or more documents. For example, the facsimile transmission could be: 1) a new document of a single page, 2) a new document having multiple pages, or a 3) cover sheet as described above and one or more additional pages. Then the user's ID is determined based either on the received fax, caller ID, or input from the user. The user's ID number could be determined by analyzing the first page of the fax for any machine-readable data or codes and determining which user they correspond to by accessing the database 312. Alternatively, before ending the facsimile transmission, the user could input his user ID number or the system could prompt the user for his ID number. Then the method determines 1906 if the first page of the facsimile transmission is a cover sheet of an existing message. This can be done by extracting a bar code or any other machine-readable codes from the image or comparing the image to other message images to determine if the image is similar to an existing message. If the fax transmission is found not to correspond to an existing message, then the method proceeds to step 1918 to add the fax as an object in a message and store the message in the multimedia message system 110. The message is preferably added to the database 312 along with references to the user or the user's list of messages, after which the method ends.

On the other hand, if the method determines 1906 that the first page of the facsimile transmission is a cover sheet of an existing message, the method proceeds to step 1908 to compare the received image to a stored image of the message for differences. This can be done by using conventional image comparison as will be understood to those skilled in the art. The differences may indicate any handwritten annotations or other marks that the user 102 has hand drawn to indicate where the remaining pages of the fax transmission should be positioned in the message 700. The system 100a then determines 1910 whether any gestures for positioning an object, creating links, or performing other actions have been added to the cover sheet. If not, the system 100a determines 1916 the locations automatically using any one of a number of algorithms such as arranged by time of creation, added in the message left to right in position, or added in the message in any open space. Various other methods for automatically determining a location in the message at which to add an object, as known to those skilled in the art, could also be used. If in step 1910, the system 100a does recognize a gesture for positioning the object, creating links, or performing other actions, the process continues by saving 1912 the location of the marks and any actions specified by the marks on the cover sheet. Then in step 1914, the method creates a new object from the pages of the facsimile transmission other than the cover sheet and positions the new object at the location determined in either step 1912 or 1916.

Those skilled in the art will recognize that this invention may also be applied to digital photocopiers that are able to copy images, and then send the image to a specified location. Thus, a copier could be used for the input device of the visual object. A generic coversheet could also be faxed or copied along with a document in a similar fashion to create a new message having only the one document. The generic cover sheet would preferably include a machine-readable user ID. The cover sheet is generic in the sense that it would be added to user's database or list of objects without a reference to a specific message or position in a particular message.

Referring now to FIG. 18, one process for remotely inputting a visual object into the multimedia messaging system 110 will be described. The method begins with the user 102 calling into the multimedia messaging system 110 from a fax machine 406. The call is received 1802, and the system 110 generates 1804 a greeting and requests the user's ID number. The user's ID is received and verified 1806 in the manner that has been described above for other methods. The system 110 requests 1808 a title for the object from the user 102. The user 102 may input the title by speaking the title of the document being faxed into the hand set or by entering numbers on the keypad. The user 102 then begins the facsimile transmission in a conventional manner by hitting the start button on the fax machine 406 and the fax is received 1812 by the system 110. Once the fax transmission is completed 1814, the system 100a stores the fax as an object in a buffer corresponding to the user 102 and uses the title as an index. Once the transmission is complete, the call is ended 1816 and the system 110 now includes a new object. While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A system for providing remote access to a multimedia message having one or more objects, the system comprising:

a multimedia messaging system having an input and an output for storing, sending and receiving multimedia messages;

a message retrieval unit having an input and an output for retrieving the message and at least one object, and outputting the objects according to a type of the object, the message retrieval unit coupled to the multimedia messaging system, the message retrieval unit also interacting with a user to receive control signals; and an object-indexing unit having an input and an output for generating and storing indices for objects contained in multimedia messages, an index indicating both an object and a command to be performed on that object, the object-indexing unit coupled to the message retrieval unit, the object indexing unit also translating signals input by the user to corresponding commands and references to objects that are portions of each message.

2. The system of claim 1, further comprising an image generation unit responsive to the message retrieval unit for sending data and images from the multimedia message system to a visual output device, the image generation unit coupled to the multimedia message system, the message retrieval unit and the object-indexing unit.

3. The system of claim 1, further comprising a message composition unit having an input and an output, the message composition unit for creating and sending messages, the message composition unit coupled to the multimedia message system, the object indexing unit, an audio communication device, and a visual input device.

4. The system of claim 1, further comprising an audio interface, the audio interface coupled to an audio communication device and to the message retrieval unit, the audio interface for translating signals from a format for the multimedia messaging system to a format for the audio communication device.

5. The system of claim 1, wherein the message retrieval unit sends and receives data and control signals to and from the audio interface to produce and send images to a visual display device.

6. The system of claim 1, further comprising a visual output interface, the visual output interface for communication with a visual output device, the visual output interface translating data and control signals to a format used by the visual output device, the visual output interface coupled to the image generation unit and the visual output device.

7. The system of claim 1, further comprising a visual input interface, the visual input interface for communication with a visual input device, the visual input interface translating data and control signals from a format used by the visual input device to the format used by the multimedia messaging system, the visual input interface coupled to the image generation unit and the multimedia messaging system.

8. The system of claim 7, wherein the visual input interface also includes an object input unit for receiving objects and storing the objects in the multimedia message system.

9. A method for remotely accessing and delivering a multimedia message in visual form, the multimedia message including at least one object, the method comprising the steps of:
   determining whether the user has requested the message in visual form;
   in response to user input, generating an image of the message including one or more indices, an index indicating both an object and a command to be performed on that object; and
   sending the image of the message to the user.

10. The method of claim 9, wherein the step of sending the image of the message to the user comprises printing the image on paper.

11. The method of claim 9, wherein the step of sending the image of the message to the user comprises sending a facsimile transmission including the image to a telephone number.

12. The method of claim 9, further comprising the step of establishing communication that includes the steps of:
   receiving a user ID number;
   verifying the user ID number;
   requesting and receiving a password; and
   verifying the password.

13. The method of claim 9, further comprising the step of:
   identifying a message with a message identification number; and
   wherein the step of determining whether the user has requested the message in visual form includes receiving the message's identification number from the user, and comparing the message identification number to a list of messages identification numbers corresponding to messages in a multimedia message system.

14. The method of claim 9 wherein the step of determining whether the user has requested the message in visual from includes:
   prompting the user whether the user wants the message in visual form;
   receiving an input from the user indicating a next un-reviewed message in visual form is wanted; and
   selecting a next message in a list of un-reviewed messages.

15. The method of claim 9, further comprising the step of determining a mechanism for delivering the message in visual form.

16. The method of claim 15, wherein the step of determining a mechanism for delivering the message further comprises the steps of:
   determining whether the user has access to a fax machine;
   retrieving a fax number from the user and configuring a multimedia message system to send the image as a facsimile to the number retrieved if user has access to a fax machine
   determining whether the user has access to e-mail;
   retrieving an e-mail address from the user and configuring the multimedia message system to send the image as an e-mail to the address retrieved if user has access to e-mail;
   determining whether the user has access to a printer;
   retrieving a printer name from the user and configuring the multimedia message system to print the image on the retrieved printer if user has access to the printer;
   determining whether the user has access to a display device; and
   configuring the multimedia message system to send the image on the display device if user has access to the display device.

17. The method of claim 9, wherein the step of generating an image of the message further comprises the steps of:
   determining the objects in the message;
   generate an image for an object in the message
   determining position of the object in the image of the message;
   generating or retrieving an index for the object;
   generate an image of the index and positioning it proximate the image of the object; and
   producing an image of the message by combining the image of the object and the image of the index.

18. The method of claim 17, further comprising the step of generating links between objects, and wherein the step of producing the image includes using the links.

19. The method for remotely retrieving an object portion of claim 18, the method further comprising the steps of:

receiving a user identification number;

verifying the user identification number; and wherein the step of receiving a request from a user for the object portion of the multimedia message includes the steps of receiving a message identification number and verifying the message identification number.

20. The method for remotely retrieving an object portion of claim 18, the method further comprising the steps of:

determining whether the index corresponds to outputting audio; and if the index corresponds to outputting audio:
retrieving an audio object corresponding for the message; and
outputting the audio object to the user via an audio communication device.

21. The method for remotely retrieving an object portion of claim 18, the method further comprising the steps of:

determining whether the index corresponds to outputting a facsimile; and if the index corresponds to outputting a facsimile:
retrieving an object corresponding to the index;
preparing a facsimile; and
outputting the facsimile to the user via a visual communication device.

22. The method of claim 21, wherein the user has input multiple indices to request a plurality of object portions, and wherein the step of outputting the facsimile to the user via a visual communication device provides the plurality of object portions in a single facsimile transmission.

23. The method for remotely retrieving an object portion of claim 18, the method further comprising the steps of:

determining whether the index corresponds to outputting a printed document; and if the index corresponds to outputting a printed document:
retrieving an object corresponding to the index;
preparing a file for printing; and
outputting the file to the user via a printer identified by the user.

24. The method of claim 17, wherein the step of generating an index produces an index based upon a type of the object, methods of delivery possible for that type of object, and an object number that is unique on a message basis.

25. The method of claim 17, wherein the step of generating an index produces an index based upon a user identification number, type of the object, and a number of the object created from an author.

26. A method for remotely retrieving an object portion of a multimedia message, the method comprising the steps of:

receiving a request from a user for an object portion of a multimedia message;

receiving an index to the object portion, the index indicating both the object portion and a command to be performed on that object portion;

determining and retrieving the object portion to which the index corresponds; and performing an action with the retrieved object portion corresponding to the index received.

27. The method of claim 26 further comprising the step of sending a visual image of the message to the user prior to the step of receiving the request from the user for an object portion.

28. The method for remotely retrieving an object portion of claim 26, the method further comprising the steps of:

determining whether the index corresponds to sending a first page of the object, sending all pages of the object, sending the object at normal size, or sending the object zoomed to fit a predefined page size;

modifying the object to generate an image according to the step of determining whether the index corresponds to sending the first page of the object; and sending the modified image.

29. A method for remotely inputting an object into a multimedia messaging system, the method comprising the steps of:

initializing communication with the multimedia messaging system;

receiving information from a user via a facsimile transmission, the facsimile transmission comprising a handwritten annotation and an index, the index indicating both a first object and a command to be performed on that first object;

translating the handwritten annotation to a command and storing the command;

storing the received information in a second object; and storing the second object in the multimedia messaging system.

30. The method of claim 29 wherein the step of receiving information from a user includes receiving a facsimile transmission having a first page and additional pages, and wherein the method further comprises the steps of:

determining whether the first page of the facsimile transmission corresponds to an existing message;

adding the object to the existing message, if it is determined that the first page of the facsimile transmission corresponds to the existing message; and adding the object to a message referenced to the user if the first page of the facsimile transmission does not correspond to an existing message.

31. The method of claim 30 wherein the step of adding the additional pages as an object to the existing message further comprises the step of positioning the object in the message using an automatic layout routine based on open space or time of addition.

32. The method of claim 30 wherein the step of adding the additional pages as an object to the existing message further comprises the steps of:

comparing the first page to an image of an existing message;

determining whether there is an annotation on the first page;

determining a location of the annotation; and adding the object to the message at a position corresponding to the location of the annotation.

33. The method of claim 29 wherein the step of receiving information from a user includes receiving an audio signal, and wherein the method further comprises the steps of:

determining whether the audio signal corresponds to an existing message;

adding the object to the existing message, if it is determined that the audio signal corresponds to an existing message; and adding the object to a message referenced to the user if it is determined that the audio signal does not correspond to an existing message.

34. The method of claim 29 wherein the step of receiving information from a user includes receiving a facsimile transmission of an image of a message having handwritten annotations, and the step of storing the received information comprises translating the handwritten annotations, and copying an existing object identified by the handwritten annotations.

35. The method of claim 29 wherein the step of initializing communication comprises the steps of:

calling into the multimedia messaging system; and requesting and receiving a user's identification number.

36. The method of claim 29 further comprising a step of providing a name for the object, the step comprising receiving audio signals from user.

* * * * *